(12) United States Patent
Yokoyama et al.

(10) Patent No.: US 7,826,175 B2
(45) Date of Patent: Nov. 2, 2010

(54) THIN-FILM MAGNETIC HEAD INCLUDING TWO MAGNETIC LAYERS AND FLAT SPIRAL COIL, AND METHOD OF MANUFACTURING SAME

(75) Inventors: Kenji Yokoyama, Tokyo (JP); Naoto Matono, Hong Kong (CN); Tatsuya Harada, Tokyo (JP); Koichi Otani, Tokyo (JP); Hidetaka Kawano, Tokyo (JP)

(73) Assignees: TDK Corporation, Tokyo (JP); SAE Magnetics (H.K.) Ltd., Shatin, N.T. (CN)

( * ) Notice: Subject to any disclaimer, the term of this patent is extended or adjusted under 35 U.S.C. 154(b) by 852 days.

(21) Appl. No.: 11/797,473

(22) Filed: May 3, 2007

(65) Prior Publication Data

US 2008/0273273 A1      Nov. 6, 2008

(51) Int. Cl.
*G11B 5/17* (2006.01)
(52) U.S. Cl. .................................. 360/123.18
(58) Field of Classification Search ............ 360/123.18, 360/123.19, 123.32, 123.25, 123.2
See application file for complete search history.

(56) References Cited

U.S. PATENT DOCUMENTS

| | | | |
|---|---|---|---|
| 5,870,262 A * | 2/1999 | Ikegawa et al. | 360/123.25 |
| 5,923,506 A * | 7/1999 | Herrera | 360/125.41 |
| 6,651,312 B1 * | 11/2003 | Sasaki | 29/603.12 |
| 6,671,135 B2 * | 12/2003 | Sasaki et al. | 360/317 |
| 6,728,065 B2 | 4/2004 | Batra et al. | |
| 6,842,308 B1 | 1/2005 | Pust et al. | |
| 6,989,963 B2 | 1/2006 | Kautzky et al. | |
| 7,126,788 B1 | 10/2006 | Liu et al. | |
| 7,126,790 B1 | 10/2006 | Liu et al. | |

FOREIGN PATENT DOCUMENTS

JP      A 2000-155913      6/2000

* cited by examiner

*Primary Examiner*—David D Davis
(74) *Attorney, Agent, or Firm*—Oliff & Berridge, PLC

(57) ABSTRACT

A thin-film magnetic head includes a first magnetic layer, a flat, spiral-shaped coil, a toroidal-shaped insulating layer covering the coil, and a second magnetic layer touching the insulating layer and disposed to sandwich part of the coil between itself and the first magnetic layer. The second magnetic layer has a recessed portion that enters a space inside the insulating layer. In the recessed portion, the bottom surface of the second magnetic layer includes a first flat portion a part of which touches the top surface of the first magnetic layer, while the top surface of the second magnetic layer includes a second flat portion located in the space and substantially parallel to the first flat portion. In a cross section that divides each of the first and second magnetic layers into two equal portions, the second flat portion is 0.3 to 6 μm in length, and a distance from an edge of the interface between the top surface of the first magnetic layer and the first flat portion closer to the medium facing surface to an edge of the top surface of the first magnetic layer farther from the medium facing surface is 0.35 to 0.95 times the length of the first flat portion.

7 Claims, 17 Drawing Sheets

THIN-FILM MAGNETIC HEAD INCLUDING TWO MAGNETIC LAYERS AND FLAT SPIRAL COIL, AND METHOD OF MANUFACTURING SAME

BACKGROUND OF THE INVENTION

1. Field of the Invention

The present invention relates to a thin-film magnetic head and a method of manufacturing the same, and to a head assembly and a magnetic disk drive each of which includes the thin-film magnetic head.

2. Description of the Related Art

For magnetic read/write devices such as magnetic disk drives, higher recording density has been constantly required to achieve a higher storage capacity and smaller dimensions. Typically, thin-film magnetic heads used in magnetic read/write devices are those having a structure in which a reproducing (read) head having a magnetoresistive element (that may be hereinafter referred to as an MR element) for reading and a recording (write) head having an induction-type electromagnetic transducer for writing are stacked on a substrate.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

One of known magnetic heads for the longitudinal magnetic recording system has a configuration in which there are provided a bottom pole layer, a top pole layer, and a flat, spiral-shaped coil having a portion disposed between the bottom pole layer and the top pole layer, as disclosed in JP 2000-155913A, for example. In this magnetic head, the bottom pole layer and the top pole layer have their respective end faces located in a medium facing surface, with a predetermined distance provided between these end faces. Furthermore, the bottom pole layer and the top pole layer are joined to each other at a position away from the medium facing surface. The joint between the bottom pole layer and the top pole layer is located in a region inside the coil.

A magnetic head for the perpendicular magnetic recording system incorporates, for example, a flat, spiral-shaped coil and a pole layer, the pole layer allowing a magnetic flux corresponding to a magnetic field generated by the coil to pass therethrough and generating a write magnetic field for writing data on a recording medium. Another known magnetic head for the perpendicular magnetic recording system further incorporates an upper magnetic layer having a shield function, as disclosed in U.S. Pat. No. 7,126,788 B1, for example. In this magnetic head, the pole layer and the upper magnetic layer have their respective end faces located in the medium facing surface, wherein the end face of the upper magnetic layer is located forward of the end face of the pole layer with a predetermined distance provided therebetween. Furthermore, the pole layer and the upper magnetic layer are joined to each other at a position away from the medium facing surface. The joint between the pole layer and the upper magnetic layer is located in a region inside the coil.

As described above, for each of the longitudinal magnetic recording system and the perpendicular magnetic recording system, examples of magnetic heads include one that incorporates two magnetic layers and a flat, spiral-shaped coil. Here, in such a magnetic head, one of the two magnetic layers that is closer to the substrate is referred to as a lower magnetic layer while the other one of the magnetic layers is referred to as an upper magnetic layer. An example of a specific configuration of such a magnetic head will now be described. In this example, the magnetic head incorporates a lower magnetic layer, a flat, spiral-shaped coil insulated from the lower magnetic layer, an insulating layer covering this coil, and an upper magnetic layer that touches the insulating layer and is disposed such that part of the coil is sandwiched between the upper and lower magnetic layers. The insulating layer is toroidal in shape. The upper magnetic layer has a recessed portion that enters the space inside the toroidal insulating layer and that is joined to the lower magnetic layer.

It is known that magnetic heads may suffer such a phenomenon that heat generated by a coil causes a magnetic layer to expand and the end face of the magnetic layer located in the medium facing surface thereby protrudes toward the recording medium. To suppress the amount of protrusion of the end face of the magnetic layer, it is effective to reduce the resistance of the coil. To achieve this, it is effective to minimize the region inside the flat, spiral-shaped coil. A reduction in dimensions of the region inside the coil leads to a reduction in volume of the space inside the toroidal insulating layer mentioned above.

Consideration will now be given to the volume of the space inside the toroidal insulating layer mentioned above. As previously mentioned, the upper magnetic layer has the recessed portion that enters the space inside the toroidal insulating layer and that is thereby joined to the lower magnetic layer. As a result, if the above-mentioned space is too small, the joint between the upper and lower magnetic layers is reduced in area, and this causes a problem that the flow of a magnetic flux passing through the upper and lower magnetic layers is hindered. Furthermore, if the space is too small, it is difficult to form without defects the recessed portion of the upper magnetic layer to be disposed in the space and a portion of another layer to be disposed on the recessed portion. This can result in a reduction in reliability of the magnetic head.

On the other hand, if the above-mentioned space is too large, the coil increases in length and thus the resistance of the coil increases, which causes the previously-mentioned phenomenon that the end face of the magnetic layer protrudes toward the recording medium to occur noticeably.

Furthermore, it is assumed that the shapes of portions of the upper and lower magnetic layers around the joint between the upper and lower magnetic layers have an influence on the flow of a magnetic flux passing through the joint between the upper and lower magnetic layers, and thereby exert an influence on the write characteristics of the magnetic head.

As described above, it is assumed that the volume of the space inside the toroidal insulating layer and the shapes of the portions of the upper and lower magnetic layers around the joint between the upper and lower magnetic layers have an influence on the characteristics and reliability of the magnetic head. Conventionally, however, no detailed consideration has been given to these factors.

OBJECT AND SUMMARY OF THE INVENTION

It is an object of the present invention to provide a thin-film magnetic head excellent in characteristics and reliability and a method of manufacturing the same, the thin-film magnetic head having a structure in which two magnetic layers are joined to each other through a space inside a toroidal insulating layer that covers a flat, spiral-shaped coil, and to provide a head assembly and a magnetic disk drive each of which incorporates the thin-film magnetic head.

A thin-film magnetic head of the invention incorporates: a medium facing surface that faces toward a recording medium; a first magnetic layer that has a top surface and extends in a direction intersecting the medium facing surface; a coil that is flat, spiral-shaped and insulated from the first magnetic layer, and that has a portion located above the top surface of the first magnetic layer; an insulating layer that is toroidal in shape with a space formed inside, and that covers the coil and has a portion located above the top surface of the first magnetic layer; and a second magnetic layer that has a bottom surface closer to the first magnetic layer and a top surface opposite to the bottom surface, extends in a direction intersecting the medium facing surface, touches the insulating layer, and is disposed such that the portion of the coil is sandwiched between the first and second magnetic layers.

The second magnetic layer has a recessed portion that enters the space inside the insulating layer. In the recessed portion, the bottom surface of the second magnetic layer includes a first flat portion a part of which touches the top surface of the first magnetic layer, and the top surface of the second magnetic layer includes a second flat portion located in the space and substantially parallel to the first flat portion.

In a cross section that is orthogonal to the medium facing surface and to the interface between the top surface of the first magnetic layer and the first flat portion and that divides each of the first and second magnetic layers into two equal portions, the second flat portion has a length within a range of 0.3 to 6 µm, and the distance from an edge of the interface between the top surface of the first magnetic layer and the first flat portion closer to the medium facing surface to an edge of the top surface of the first magnetic layer farther from the medium facing surface is within a range of 0.35 to 0.95 times a length of the first flat portion.

According to the thin-film magnetic head of the invention, it is required that the length of the second flat portion in the above-mentioned cross section be within the range of 0.3 to 6 µm. This makes it possible to form without defects the recessed portion of the second magnetic layer to be disposed in the above-mentioned space and a portion of another layer to be disposed on the recessed portion, while suppressing an increase in resistance of the coil.

According to the thin-film magnetic head of the invention, it is further required that, in the above-mentioned cross section, the distance from the edge of the interface between the top surface of the first magnetic layer and the first flat portion closer to the medium facing surface to the edge of the top surface of the first magnetic layer farther from the medium facing surface be within the range of 0.35 to 0.95 times the length of the first flat portion. This makes it possible to improve write characteristics.

In the above-mentioned cross section, the distance from the edge of the interface between the top surface of the first magnetic layer and the first flat portion closer to the medium facing surface to the edge of the top surface of the first magnetic layer farther from the medium facing surface may be within a range of 0.5 to 0.9 times the length of the first flat portion.

The thin-film magnetic head of the invention may further incorporate a film disposed on the top surface of the second magnetic layer, the film having a recessed portion formed along the recessed portion of the second magnetic layer. Furthermore, in the magnetic head of the invention, the first magnetic layer may constitute at least part of a pole layer that generates a write magnetic field for writing data on the recording medium by means of a perpendicular magnetic recording system, and the second magnetic layer may constitute at least part of a shield layer.

A head assembly of the invention incorporates: a slider including the thin-film magnetic head of the invention and disposed to face toward a recording medium; and a supporter flexibly supporting the slider.

A magnetic disk drive of the invention incorporates: a slider including the thin-film magnetic head of the invention and disposed to face toward a recording medium that is driven to rotate; and an alignment device supporting the slider and aligning the slider with respect to the recording medium.

A method of manufacturing the thin-film magnetic head of the invention includes the steps of: forming the first magnetic layer; forming the coil after the first magnetic layer is formed; forming the insulating layer after the coil is formed; and forming the second magnetic layer after the insulating layer is formed.

The present invention requires that, in the cross section that is orthogonal to the medium facing surface and to the interface between the top surface of the first magnetic layer and the first flat portion and that divides each of the first and second magnetic layers into two equal portions, the length of the second flat portion be within the range of 0.3 to 6 µm. This makes it possible to form without defects the recessed portion of the second magnetic layer to be disposed in the above-mentioned space and a portion of another layer to be disposed on the recessed portion, while suppressing an increase in resistance of the coil. The invention further requires that, in the above-mentioned cross section, the distance from the edge of the interface between the top surface of the first magnetic layer and the first flat portion closer to the medium facing surface to the edge of the top surface of the first magnetic layer farther from the medium facing surface be within the range of 0.35 to 0.95 times the length of the first flat portion. This makes it possible to improve write characteristics. These features of the invention can provide improved characteristics and reliability of the thin-film magnetic head.

Other and further objects, features and advantages of the invention will appear more fully from the following description.

DETAILED DESCRIPTION OF THE PREFERRED EMBODIMENT

First Embodiment

Figure 2:
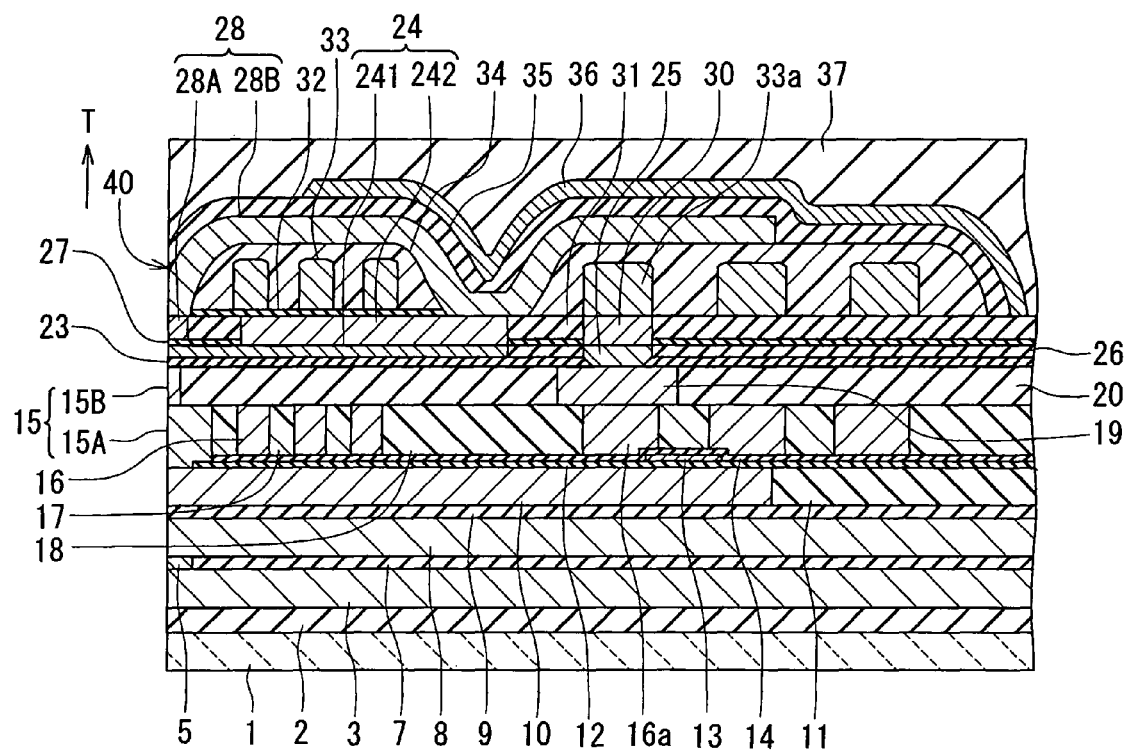
FIG. 2 is a cross-sectional view illustrating the configuration of the magnetic head of the embodiment of the invention.
Figure 3:
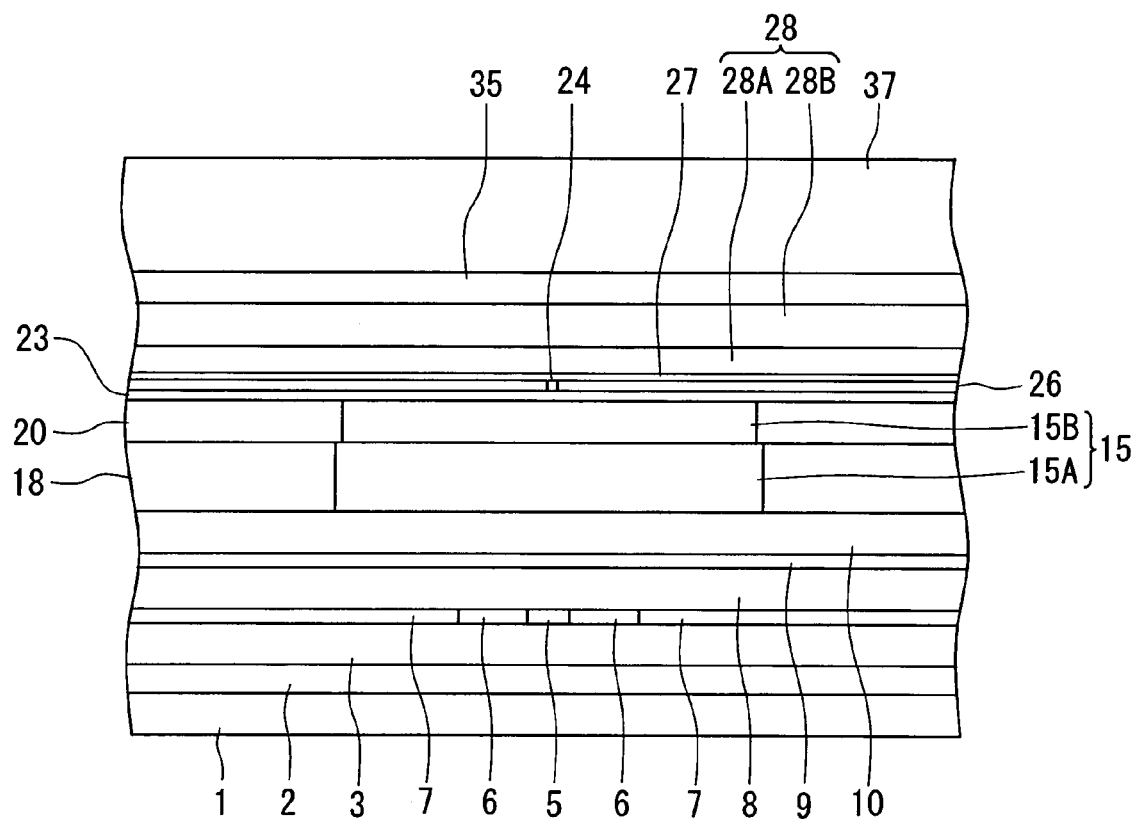
FIG. 3 is a front view illustrating a medium facing surface of the magnetic head of the embodiment of the invention.

An embodiment of the invention will now be described in detail with reference to the accompanying drawings. Reference is now made to FIG. 2 and FIG. 3 to describe the configuration of a thin-film magnetic head (hereinafter simply referred to as a magnetic head) of the embodiment of the invention. Here is given an example of a magnetic head for a perpendicular magnetic recording system in which a TMR element utilizing a tunneling magnetoresistive effect is employed as the MR element. FIG. 2 is a cross-sectional view illustrating the configuration of the magnetic head. FIG. 3 is a front view of the medium facing surface of the magnetic head. FIG. 2 illustrates a cross section orthogonal to the medium facing surface and the top surface of the substrate. The arrow indicated with T in FIG. 2 shows the direction of travel of a recording medium.

As shown in FIG. 2, the magnetic head of the embodiment has a medium facing surface 40 that faces toward a recording medium. As shown in FIG. 2 and FIG. 3, the magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias field applying layers 6 disposed adjacent to the two sides of the MR element 5 with insulating films (not shown) respectively disposed therebetween; and an insulating layer 7 disposed around the MR element 5 and the bias field applying layers 6. The MR element 5 has an end located in the medium facing surface 40. The insulating layer 7 is made of an insulating material such as alumina. The magnetic head further includes: a second read shield layer 8 made of a magnetic material and disposed on the MR element 5, the bias field applying layers 6 and the insulating layer 7; and a separating layer 9 made of a nonmagnetic material such as alumina and disposed on the second read shield layer 8. The portion from the first read shield layer 3 to the second read shield layer 8 makes up a read head. Alternatively, in place of the second read shield layer 8, there may be provided a layered film made up of two magnetic layers and a nonmagnetic layer disposed between the two magnetic layers. The nonmagnetic layer is made of a nonmagnetic material such as ruthenium (Ru) or alumina.

The MR element 5 is a TMR element. A sense current for detecting magnetic signals is fed to the MR element 5 in a direction intersecting the plane of each layer making up the MR element 5, such as the direction perpendicular to the plane of each layer making up the MR element 5.

The magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further includes: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina. An end of each of the insulating films 12 and 14 closer to the medium facing surface 40 is located at a distance from the medium facing surface 40. The end of the insulating film 14 closer to the medium facing surface 40 is located farther from the medium facing surface 40 than the end of the insulating film 12 closer to the medium facing surface 40.

The magnetic head further includes a first shield 15 disposed on the magnetic layer 10. The first shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40.

The magnetic head further includes: a coil 16 made of a conductive material and disposed on the insulating film 14; an insulating layer 17 with which the space between the coil 16 and the first layer 15A and the space between respective adjacent turns of the coil 16 are filled; and an insulating layer 18 disposed around the first layer 15A, the coil 16 and the insulating layer 17. The coil 16 is flat, spiral-shaped. The coil 16 includes a connecting portion 16a that is a portion near an inner end of the coil 16 and connected to another coil described later. The insulating layer 17 is made of photoresist or alumina, for example. The insulating layer 18 is made of alumina, for example. The first layer 15A, the coil 16, the insulating layer 17 and the insulating layer 18 have flattened top surfaces.

The magnetic head further includes: a connecting layer 19 made of a conductive material and disposed on the connecting portion 16a; and an insulating layer 20 made of an insulating material such as alumina and disposed around the second layer 15B and the connecting layer 19. The connecting layer 19 may be made of a material the same as that of the second layer 15B. The second layer 15B, the connecting layer 19 and the insulating layer 20 have flattened top surfaces.

The magnetic head further includes a first gap layer 23 disposed on the second layer 15B, the connecting layer 19 and the insulating layer 20. The first gap layer 23 has an opening formed in a region corresponding to the top surface of the connecting layer 19. The first gap layer 23 is made of a nonmagnetic insulating material such as alumina.

The magnetic head further includes: a pole layer 24 made of a magnetic material and disposed on the first gap layer 23; and a connecting layer 25 made of a conductive material and disposed on the connecting layer 19. The pole layer 24 includes a first layer 241 disposed on the first gap layer 23, and a second layer 242 disposed on the first layer 241. The first layer 241 has an end face located in the medium facing surface 40. An end face of the second layer 242 closer to the medium facing surface 40 is located at a distance from the medium facing surface 40. The second layer 242 corresponds to the first magnetic layer of the invention. The connecting layer 25 may be made of a material the same as that of the first layer 241.

The magnetic head further includes an insulating layer 26 made of an insulating material such as alumina and disposed around the first layer 241 and the connecting layer 25. The connecting layer 25 is connected to the connecting layer 19 through the opening of the first gap layer 23. The first layer 241, the connecting layer 25 and the insulating layer 26 have flattened top surfaces.

The magnetic head further includes a second gap layer 27 disposed on the first layer 241 and the insulating layer 26. The second gap layer 27 has an opening for exposing a portion of the top surface of the first layer 241 away from the medium facing surface 40, and an opening for exposing the top surface of the connecting layer 25. The second gap layer 27 is made of a nonmagnetic material such as alumina. The second layer 242 is disposed on the portion of the top surface of the first layer 241 exposed from the opening of the second gap layer 27.

The magnetic head further includes a second shield 28 disposed on the second gap layer 27. The second shield 28 includes: a first layer 28A disposed on the second gap layer 27; and a second layer 28B disposed on the first layer 28A. The first layer 28A and the second layer 28B are made of a magnetic material. Each of the first layer 28A and the second layer 28B has an end face located in the medium facing surface 40.

The magnetic head further includes: a connecting layer 30 made of a conductive material and disposed on the connecting layer 25; and an insulating layer 31 made of an insulating material such as alumina and disposed around the first layer 28A, the second layer 242 and the connecting layer 30. The second layer 242 and the connecting layer 30 may be made of a material the same as that of the first layer 28A. The first layer 28A, the second layer 242, the connecting layer 30 and the insulating layer 31 have flattened top surfaces.

The magnetic head further includes an insulating layer 32 made of an insulating material such as alumina and disposed on a portion of the top surface of each of second layer 242 and the insulating layer 31. The top surface of the first layer 28A, a portion of the top surface of the second layer 242 near an end thereof farther from the medium facing surface 40, and the top surface of the insulating layer 30 are not covered with the insulating layer 32.

The magnetic head further includes a coil 33 made of a conductive material and disposed on the insulating layers 31 and 32. The coil 33 is flat, spiral-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The magnetic head further includes an insulating layer 34 disposed to cover the coil 33. The insulating layer 34 is toroidal in shape with a space formed inside. The insulating layer 34 is made of photoresist or alumina, for example. The second layer 28B of the second shield 28 is disposed on the first layer 28A, the second layer 242 and the insulating layer 34, and connects the first layer 28A and the second layer 242 to each other. The second layer 28B corresponds to the second magnetic layer of the invention.

The magnetic head further includes a protection film 35 disposed on the top surface of the second layer 28B, and a functional film 36 disposed on the protection film 35. The protection film 35 is formed to cover the second layer 28B and the insulating layer 34. The protection film 35 has an end face located in the medium facing surface 40. The protection film 35 is made of alumina, for example. In the example shown in FIG. 2, an end face of the functional film 36 closer to the medium facing surface 40 is located at a distance from the medium facing surface 40. However, the functional film 36 may have an end face located in the medium facing surface 40. The functional film 36 is made of SiC or AlN, for example.

The magnetic head further includes an overcoat layer 37 made of an insulating material such as alumina and disposed to cover the protection film 35 and the functional film 36. The portion from the magnetic layer 10 to the second layer 28B makes up a write head.

As described so far, the magnetic head has the medium facing surface 40 that faces toward the recording medium, the read head, and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). In the magnetic head, the write head writes data on the recording medium while the read head reads data stored on the recording medium.

The read head includes the MR element 5, and the first read shield layer 3 and the second read shield layer 8 that are disposed to sandwich the MR element 5 therebetween. FIG. 2 and FIG. 3 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. Besides the first read shield layer 3 and the second read shield layer 8, there may be provided a pair of electrodes on top and bottom of the MR element 5, respectively. The MR element 5 has a resistance that changes in response to an external magnetic field, that is, a signal magnetic field sent from the recording medium. The resistance of the MR element 5 can be determined from the sense current. It is thus possible for the read head to read data stored on the recording medium.

The MR element 5 is not limited to the TMR element but may be a GMR (giant-magnetoresistive) element. The GMR element may be one having a CIP (current-in-plane) structure in which the sense current is fed in a direction nearly parallel to the plane of each layer making up the GMR element, or may be one having a CPP (current-perpendicular-to-plane) structure in which the sense current is fed in a direction intersecting the plane of each layer making up the GMR element, such as the direction perpendicular to the plane of each layer making up the GMR element. In the case in which the MR element 5 is a GMR element having the CIP structure, a pair of electrodes for feeding the sense current to the MR element 5 are respectively provided on both sides of the MR element 5 taken in the width direction, and shield gap films made of an insulating material are respectively provided between the MR element 5 and the first read shield layer 3 and between the MR element 5 and the second read shield layer 8.

The write head includes the magnetic layer 10, the first shield 15, the coil 16, the first gap layer 23, the pole layer 24, the second gap layer 27, the second shield 28, and the coil 33. The first shield 15 is located closer to the substrate 1 than the second shield 28.

The coils 16 and 33 generate a magnetic field that corresponds to data to be written on the recording medium. The pole layer 24 has an end face located in the medium facing surface 40, allows a magnetic flux corresponding to the magnetic field generated by the coils 16 and 33 to pass, and generates a write magnetic field used for writing the data on the recording medium by means of the perpendicular magnetic recording system.

The first shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first shield 15 and the pole layer 24. In the present embodiment, the first shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The magnetic layer 10 has a function of returning a magnetic flux that has been generated from the end face of the pole layer 24 and that has magnetized the recording medium. FIG. 2 shows an example in which the end face of the magnetic layer 10 is located in the medium facing surface 40. However, since the magnetic layer 10 is connected to the first shield 15 that has the end face located in the medium facing surface 40, an end face of the magnetic layer 10 closer to the medium facing surface 40 may be located at a distance from the medium facing surface 40.

In the medium facing surface 40, the end face of the first shield 15 (the end face of the second layer 15B) is located backward of the end face of the pole layer 24 (the end face of the first layer 241) along the direction T of travel of the recording medium (that is, located closer to the air-inflow end of the slider) with a predetermined small distance provided therebetween by the first gap layer 23. The distance between the end face of the pole layer 24 and the end face of the first shield 15 in the medium facing surface 40 is preferably within a range of 0.05 to 0.7 µm, and more preferably within a range of 0.1 to 0.3 µm.

The first shield 15 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density. However, the first shield 15 is not an essential component of the write head and can be dispensed with.

The second shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second shield 28 and the pole layer 24. In the present embodiment, the second shield 28 includes the first layer 28A disposed on the second gap layer 27, and the second layer 28B disposed on the first layer 28A. Part of the coil 33 is disposed to pass through the space surrounded by the pole layer 24 and the second shield 28. The second shield 28 is connected to the pole layer 24 at a position away from the medium facing surface 40. The pole layer 24 and the second shield 28 form a magnetic path that allows a magnetic flux corresponding to the magnetic field generated by the coil 33 to pass therethrough.

In the medium facing surface 40, the end face of the second shield 28 (the end face of the first layer 28A) is located forward of the end face of the pole layer 24 (the end face of the first layer 241) along the direction T of travel of the recording medium (that is, located closer to the air-outflow end of the slider) with a specific small distance provided therebetween by the second gap layer 27. The distance between the end face of the pole layer 24 and the end face of the second shield 28 in the medium facing surface 40 is preferably equal to or smaller than 0.2 µm, and more preferably within a range of 25 to 50 nm.

The position of the end of a bit pattern to be written on the recording medium is determined by the position of an end of the pole layer 24 closer to the second gap layer 27 in the medium facing surface 40. The second shield 28 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density. Furthermore, the second shield 28 takes in a disturbance magnetic field applied from outside the magnetic head to the magnetic head. It is thereby possible to prevent erroneous writing on the recording medium caused by the disturbance magnetic field intensively taken in into the pole layer 24. The second shield 28 also has a function of returning a magnetic flux that has been generated from the end face of the pole layer 24 and has magnetized the recording medium.

FIG. 2 shows an example in which neither the magnetic layer 10 nor the first shield 15 is connected to the pole layer 24. However, the magnetic layer 10 may be connected to the pole layer 24 at a position away from the medium facing surface 40. The coil 16 is not an essential component of the write head and can be dispensed with.

In the example shown in FIG. 2, the pole layer 24 is made up of the first layer 241 and the second layer 242, and the second layer 242 is disposed on the first layer 241, that is, disposed forward of the first layer 241 along the direction T of travel of the recording medium (i.e., closer to the air-outflow end of the slider). However, the second layer 242 may be disposed below the first layer 241, that is, disposed backward of the first layer 241 along the direction T of travel of the recording medium (i.e., closer to the air-inflow end of the slider). In this case, the first layer 241 corresponds to the first magnetic layer of the invention. The pole layer 24 may be made up of a single layer only. In this case, the single layer corresponds to the first magnetic layer of the invention.

In the example shown in FIG. 2, the second shield 28 is made up of the first layer 28A and the second layer 28B. However, the second shield 28 may be made up of a single layer only. In this case, the single layer corresponds to the second magnetic layer of the invention.

The heater 13 is provided for heating the components of the write head including the pole layer 24 so as to control the distance between the recording medium and the end face of the pole layer 24 located in the medium facing surface 40. Two leads that are not shown are connected to the heater 13. For example, the heater 13 is composed of an NiCr film or a layered film made up of a Ta film, an NiCu film and a Ta film. The heater 13 is energized through the two leads and thereby produces heat, and heats the components of the write head. As a result, the components of the write head expand and the end face of the pole layer 24 located in the medium facing surface 40 thereby gets closer to the recording medium.

The functional film 36 has a function of suppressing the protrusion of the end face of the second layer 28B located in the medium facing surface 40 toward the recording medium.

Figure 1:
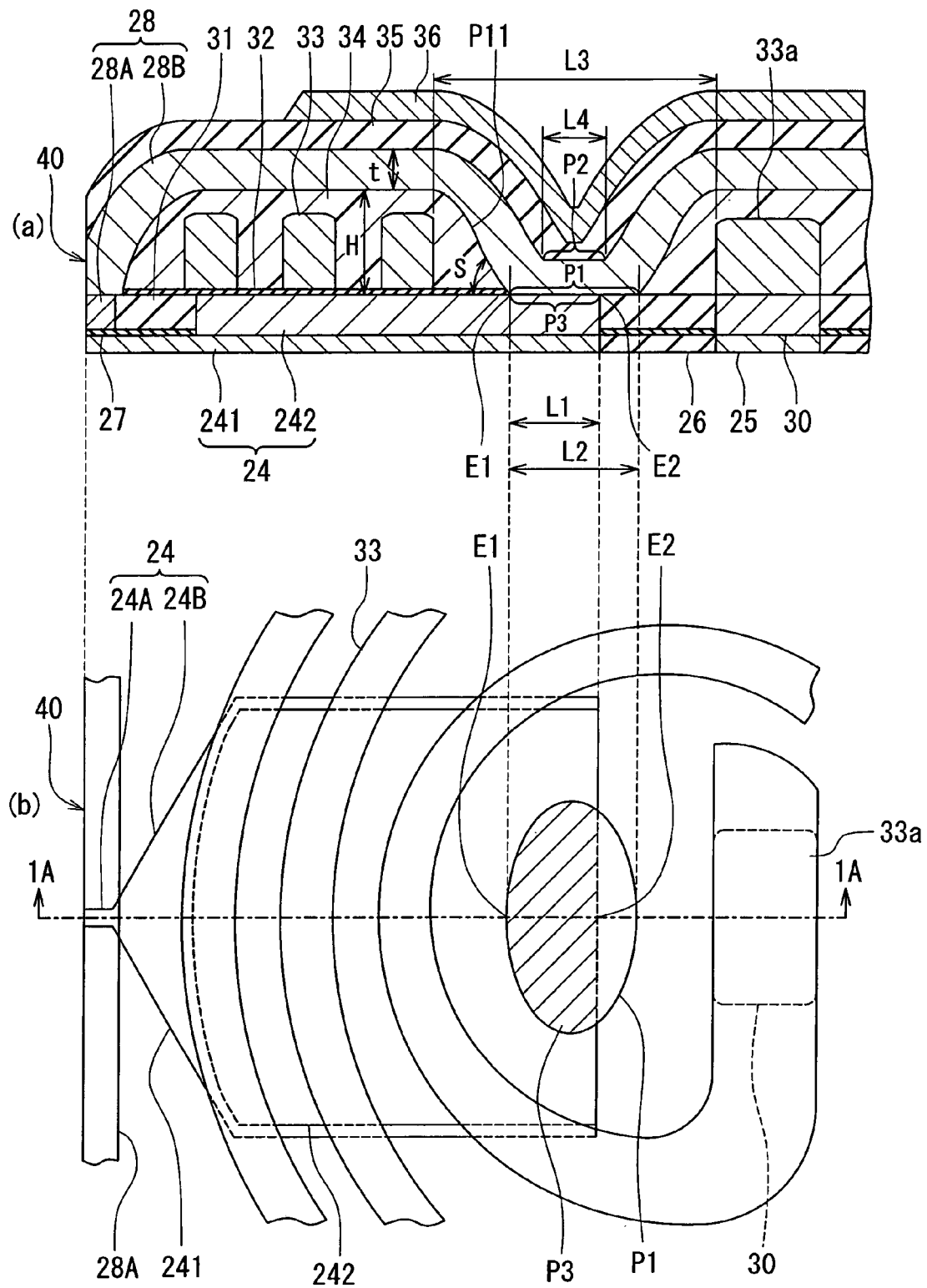
FIG. 1 is an explanatory view illustrating the configuration of a main part of a magnetic head of an embodiment of the invention.

Reference is now made to FIG. 1 to describe the pole layer 24, the coil 33, the insulating layer 34 and the second shield 28 of the present embodiment in detail. In FIG. 1, the portion (a) is a cross-sectional view of a main part of the magnetic head, while the portion (b) is a top view of the main part of the magnetic head. In FIG. 1, the portion (a) shows a cross section taken along line 1A-1A of the portion (b).

The pole layer 24 includes: a track width defining portion 24A having a first end located in the medium facing surface 40 and a second end located away from the medium facing surface 40, the track width defining portion 24A having a width that defines track width; and a wide portion 24B coupled to the second end of the track width defining portion 24A and having a width greater than that of the track width defining portion 24A. The width of the track width defining portion 24A is nearly uniform. The wide portion 24B is, for example, equal in width to the track width defining portion 24A at the boundary with the track width defining portion 24A, and gradually increases in width with increasing distance from the medium facing surface 40 and then maintains a constant width to the end of the wide portion 24B.

In the following description, the second layer 242 of the pole layer 24 may also be referred to as a first magnetic layer 242, and the second layer 28B of the second shield 28 as a second magnetic layer 28B. The first magnetic layer 242 has a top surface and extends in a direction intersecting the medium facing surface 40. The flat, spiral-shaped coil 33 is insulated from the first magnetic layer 242, and has a portion located above the top surface of the first magnetic layer 242. The insulating layer 34 covering the coil 33 is toroidal in shape with a space formed inside, and has a portion located above the top surface of the first magnetic layer 242. The second magnetic layer 28B has a bottom surface closer to the first magnetic layer 242 and a top surface opposite to the bottom surface, and extends in a direction intersecting the medium facing surface 40. The second magnetic layer 28B is disposed such that part of the coil 33 is sandwiched between the second magnetic layer 28B and the first magnetic layer 242.

The second magnetic layer 28B has a recessed portion that enters the space inside the insulating layer 34. In this recessed portion, the bottom surface of the second magnetic layer 28B includes a first flat portion P1, part of the first flat portion P1 touching the top surface of the first magnetic layer 242. In the recessed portion, the top surface of the second magnetic layer 28B includes a second flat portion P2 that is located in the above-mentioned space and that is substantially parallel to the first flat portion P1. The first magnetic layer 242 and the second magnetic layer 28B are joined to each other at the interface P3 between the top surface of the first magnetic layer 242 and the first flat portion P1. That is, this interface P3 is the joint between the first magnetic layer 242 and the second magnetic layer 28B.

Each of the protection film 35 and the functional film 36 has a recessed portion formed along the recessed portion of the second magnetic layer 28B.

Here, various dimensions in the cross section shown in the portion (a) of FIG. 1, that is, the cross section that is orthogonal to the medium facing surface 40 and to the interface P3 between the top surface of the first magnetic layer 242 and the first flat portion P1 and that divides each of the first magnetic layer 242 and the second magnetic layer 28B into two equal portions, will be indicated with symbols as follows. The distance from an edge E1 of the interface P3 between the top surface of the first magnetic layer 242 and the first flat portion P1 closer to the medium facing surface 40 to an edge E2 of the top surface of the first magnetic layer 242 farther from the medium facing surface 40 is indicated with L1. The length of the first flat portion P1 is indicated with L2. The distance between two inner edges of the coil 33 located opposite to each other with the first flat portion P1 disposed in between is indicated with L3. The length of the second flat portion P2 is indicated with L4. The maximum distance between the first magnetic layer 242 and the second magnetic layer 28B is indicated with H. The thickness of the second magnetic layer 28B is indicated with 't'. The angle formed between the top surface of the first magnetic layer 242 and an inclined portion P11 of the bottom surface of the recessed portion of the second magnetic layer 28B touching the surface of the insulating layer 34 is indicated with S.

In the present embodiment, the length L4 of the second flat portion P2 in the above-mentioned cross section is within a range of 0.3 to 6 μm. Furthermore, in the above-mentioned cross section, the distance L1 from the edge E1 to the edge E2 is within a range of 0.35 to 0.95 times the length L2 of the first flat portion P1. The reasons for these definitions will be described in detail later.

Reference is now made to FIG. 4 to FIG. 21 to describe a method of manufacturing the magnetic head of the embodiment. Each of FIG. 4 to FIG. 21 is a cross-sectional view of a layered structure obtained in the course of manufacture of the magnetic head. In FIG. 4 to FIG. 21 the portions from the substrate 1 to the separating layer 9 are omitted. In FIG. 4 to FIG. 21 the broken line marked with ABS indicates the position at which the medium facing surface 40 is to be formed.

In the method of manufacturing the magnetic head of the embodiment, for example, components of a plurality of magnetic heads are formed on a single substrate (wafer) to thereby fabricate a substructure in which pre-slider portions each of which is to become a slider later are aligned in a plurality of rows. Next, the substructure is cut to fabricate a slider aggregate including a single row of the pre-slider portions. Next, a surface formed in the slider aggregate by cutting the substructure is lapped to form the medium facing surfaces 40 of the pre-slider portions that the slider aggregate includes. Next, flying rails are formed in the medium facing surfaces 40. Next, the slider aggregate is cut so that the pre-slider portions are separated from one another, and a plurality of sliders respectively including the magnetic heads are thereby obtained.

Attention being drawn to one of the magnetic heads, the method of manufacturing the magnetic head of the embodiment will now be described. In this method, first, the insulating layer 2 is formed on the substrate 1. Next, the first read shield layer 3 is formed on the insulating layer 2. Next, the MR element 5, the two bias field applying layers 6 and the insulating layer 7 are formed on the first read shield layer 3. Next, the second read shield layer 8 is formed on the MR element 5, the bias field applying layers 6 and the insulating layer 7. Next, the separating layer 9 is formed on the second read shield layer 8.

Figure 4:
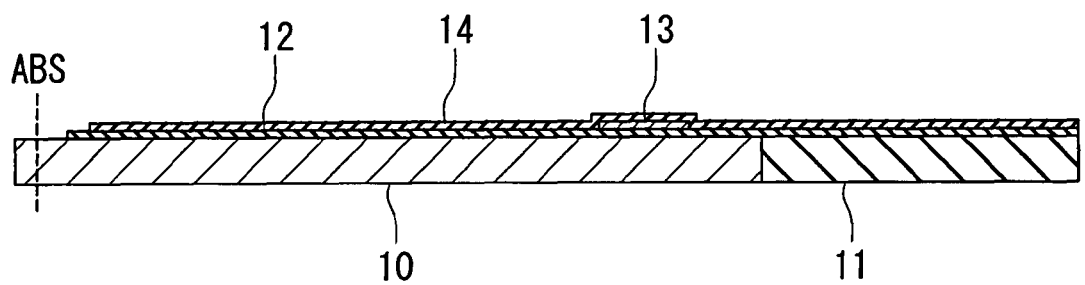
FIG. 4 is a cross-sectional view illustrating a step of a method of manufacturing the magnetic head of the embodiment of the invention.

FIG. 4 illustrates the next step. In this step, first, the magnetic layer 10 is formed on the separating layer 9 by frame plating, for example. Next, the insulating layer 11 is formed to cover the magnetic layer 10. Next, the insulating layer 11 is polished by chemical mechanical polishing (hereinafter referred to as CMP), for example, so that the magnetic layer 10 is exposed, and the top surfaces of the magnetic layer 10 and the insulating layer 11 are thereby flattened. Next, the insulating film 12 is formed on the magnetic layer 10 and the insulating layer 11. Next, the heater 13, and the leads (not shown) are formed on the insulating film 12. Next, the insulating film 14 is formed on the insulating film 12, the heater 13 and the leads so as to cover the heater 13 and the leads.

Figure 5:
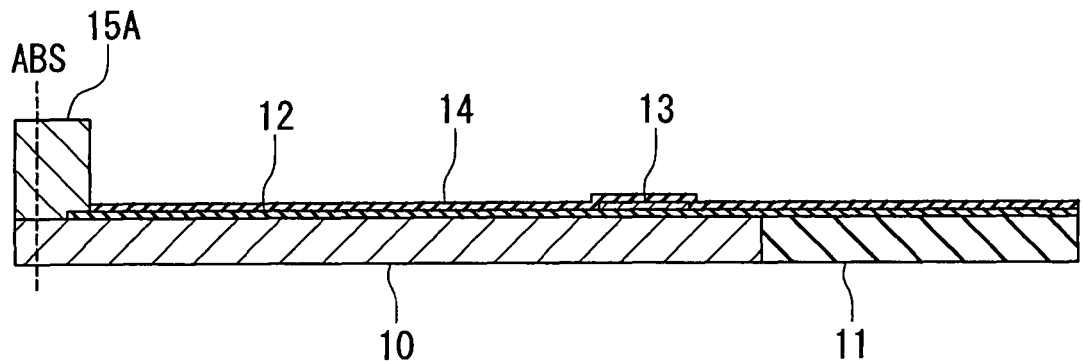
FIG. 5 is a cross-sectional view illustrating a step that follows the step of FIG. 4.
Figure 6:
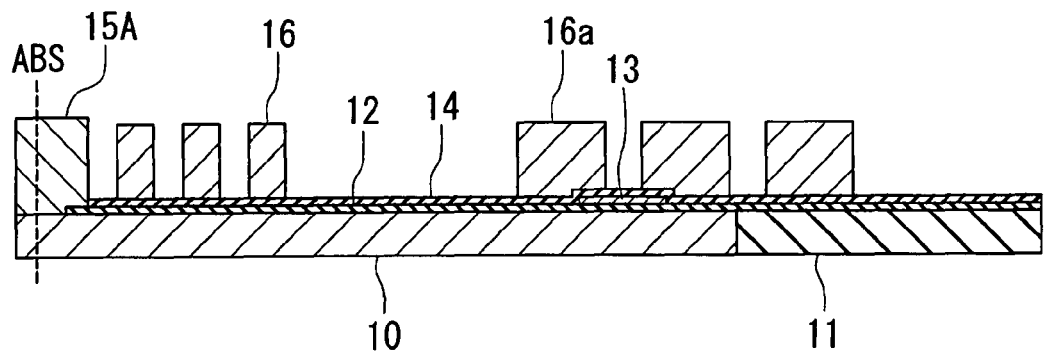
FIG. 6 is a cross-sectional view illustrating a step that follows the step of FIG. 5.
Figure 7:
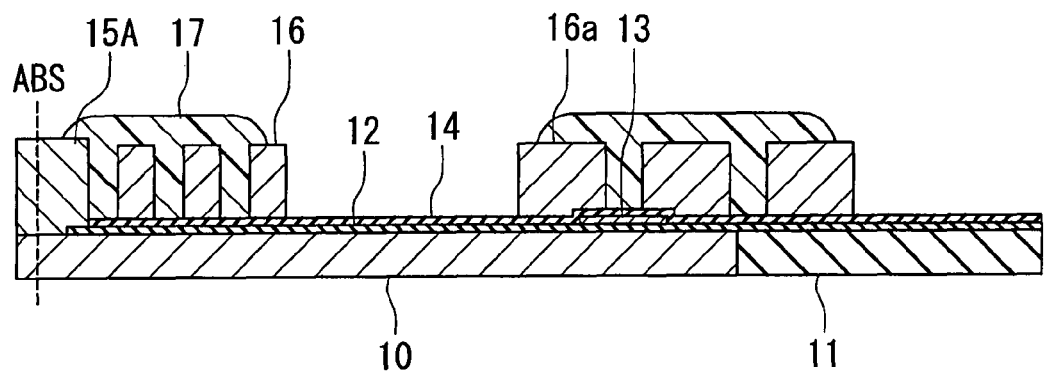
FIG. 7 is a cross-sectional view illustrating a step that follows the step of FIG. 6.

Next, as shown in FIG. 5, the first layer 15A of the first shield 15 is formed on the magnetic layer 10 by frame plating, for example. Next, as shown in FIG. 6, the coil 16 is formed on the insulating film 14 by frame plating, for example. Next, as shown in FIG. 7, the insulating layer 17 is formed so that the space between the coil 16 and the first layer 15A and the space between the respective adjacent turns of the coil 16 are filled with the insulating layer 17.

Figure 8:
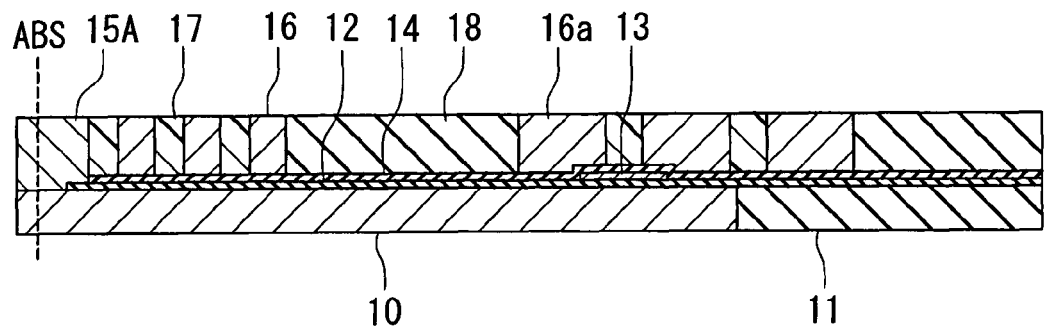
FIG. 8 is a cross-sectional view illustrating a step that follows the step of FIG. 7.

FIG. 8 illustrates the next step. In this step, first, the insulating layer 18 is formed on the entire top surface of the layered structure of FIG. 7. Next, the insulating layer 18 is polished by CMP, for example, so that the first layer 15A and the coil 16 are exposed, and the top surfaces of the first layer 15A, the coil 16 and the insulating layer 18 are thereby flattened.

Figure 9:
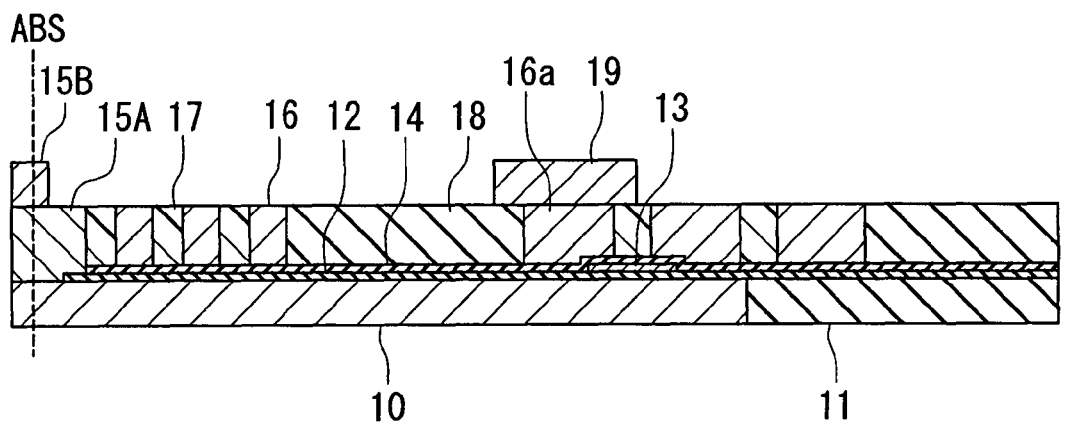
FIG. 9 is a cross-sectional view illustrating a step that follows the step of FIG. 8.

Next, as shown in FIG. 9, the second layer 15B and the connecting layer 19 are formed by frame plating, for example.

Figure 10:
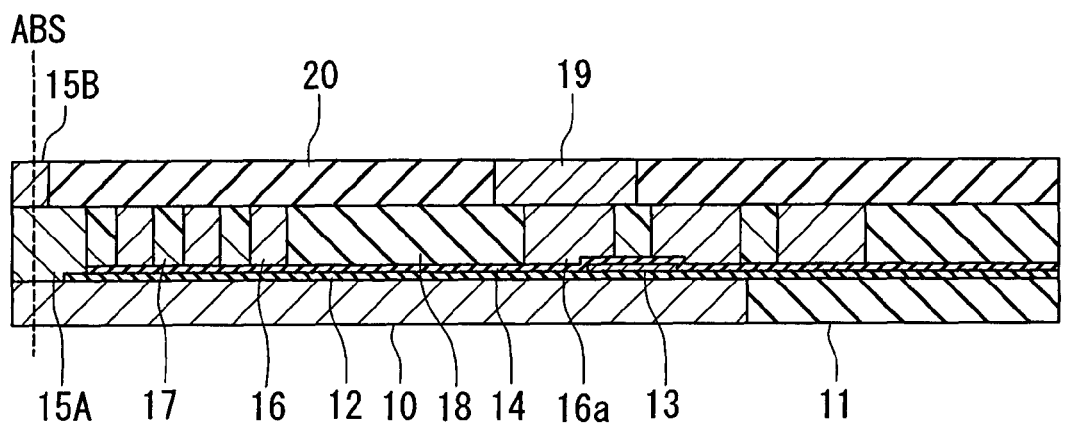
FIG. 10 is a cross-sectional view illustrating a step that follows the step of FIG. 9.

FIG. 10 illustrates the next step. In this step, first, the insulating layer 20 is formed on the entire top surface of the layered structure of FIG. 9. Next, the insulating layer 20 is polished by CMP, for example, so that the second layer 15B and the connecting layer 19 are exposed, and the top surfaces of the second layer 15B, the connecting layer 19 and the insulating layer 20 are thereby flattened.

Figure 11:
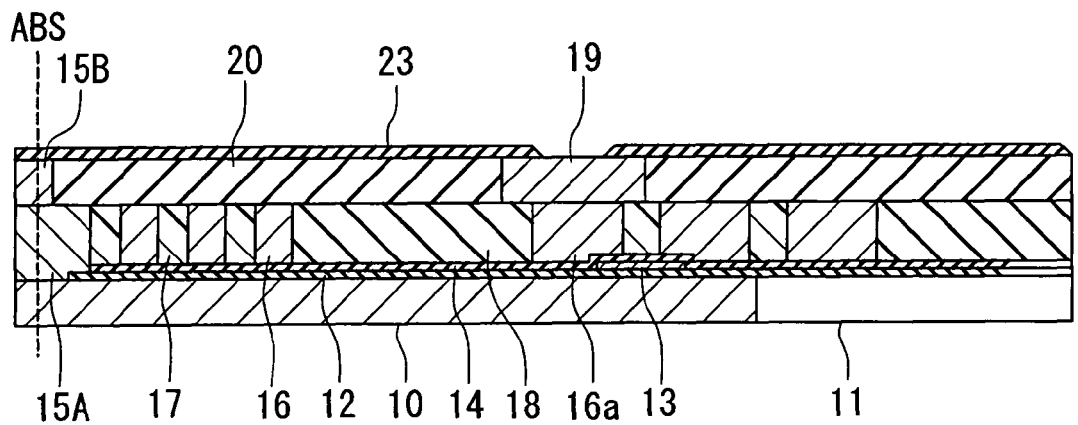
FIG. 11 is a cross-sectional view illustrating a step that follows the step of FIG. 10.

FIG. 11 illustrates the next step. In this step, first, the first gap layer 23 is formed on the entire top surface of the layered structure of FIG. 10. Next, an opening is formed by ion milling, for example, in a region of the first gap layer 23 corresponding to the top surface of the connecting layer 19.

Figure 12:
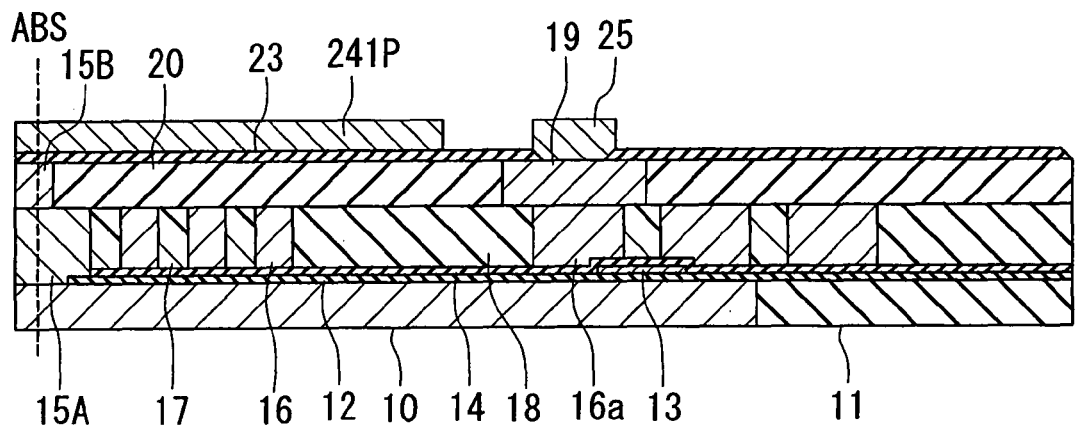
FIG. 12 is a cross-sectional view illustrating a step that follows the step of FIG. 11.

Next, as shown in FIG. 12, a plating layer 241P, which is to become the first layer 241 of the pole layer 24 later, and the connecting layer 25 are formed by frame plating.

Figure 13:
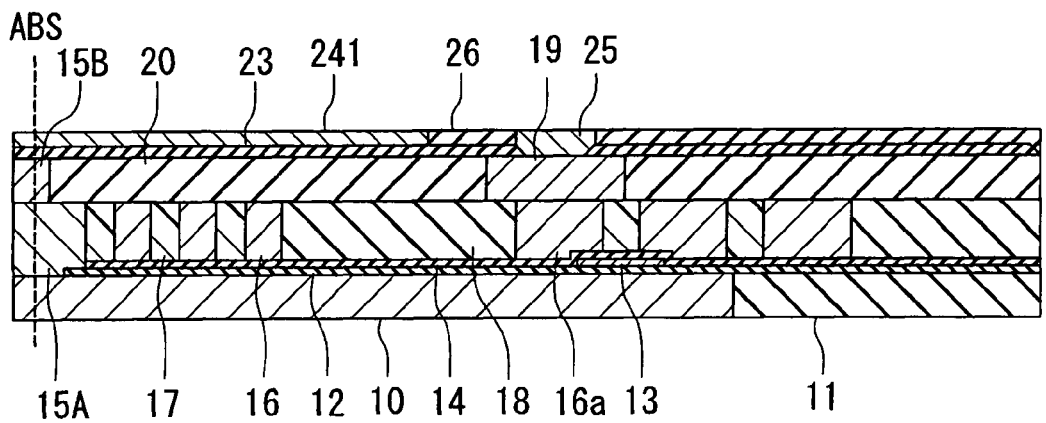
FIG. 13 is a cross-sectional view illustrating a step that follows the step of FIG. 12.

FIG. 13 illustrates the next step. In this step, first, the insulating layer 26 is formed on the entire top surface of the layered structure of FIG. 12. Next, the insulating layer 26, the plating layer 241P and the connecting layer 25 are polished by CMP, for example, so that the plating layer 241P and the connecting layer 25 are exposed and these layers achieve desired thicknesses, and the top surfaces of these layers are thereby flattened. The plating layer 241P becomes the first layer 241 by being polished to achieve its desired thickness.

Figure 14:
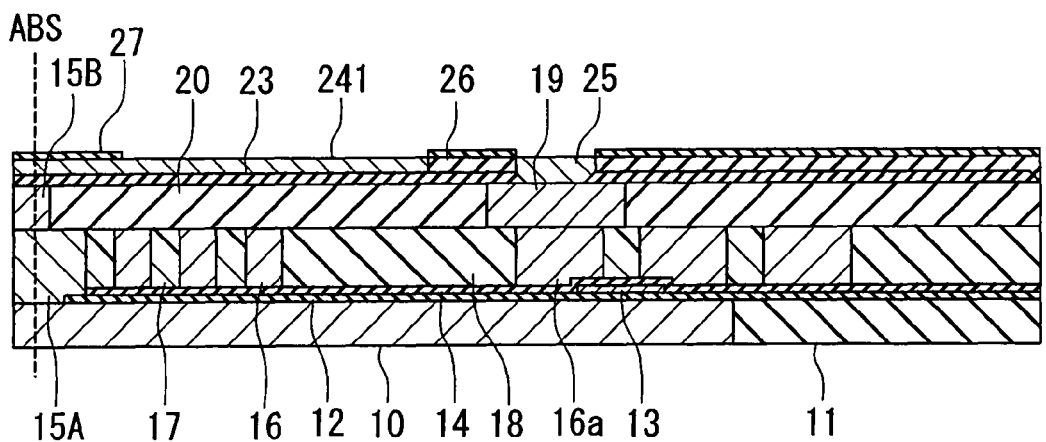
FIG. 14 is a cross-sectional view illustrating a step that follows the step of FIG. 13.

FIG. 14 illustrates the next step. In this step, first, the second gap layer 27 is formed on the entire top surface of the layered structure of FIG. 13. Next, an opening for exposing a portion of the top surface of the first layer 241 and an opening for exposing the top surface of the connecting layer 25 are formed in the second gap layer 27 by ion milling, for example.

Figure 15:
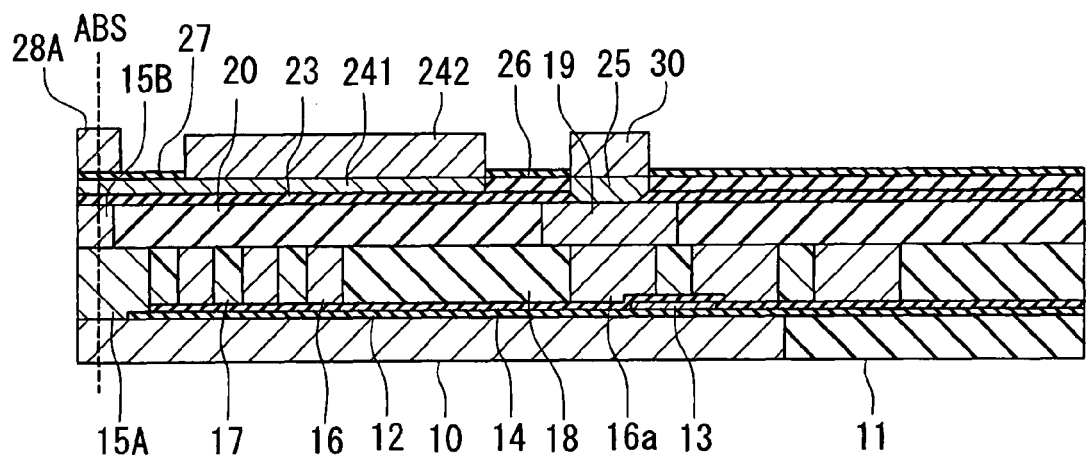
FIG. 15 is a cross-sectional view illustrating a step that follows the step of FIG. 14.

Next, as shown in FIG. 15, the first layer 28A of the second shield 28, the second layer 242 of the pole layer 24, and the connecting layer 30 are formed by frame plating, for example.

Figure 16:
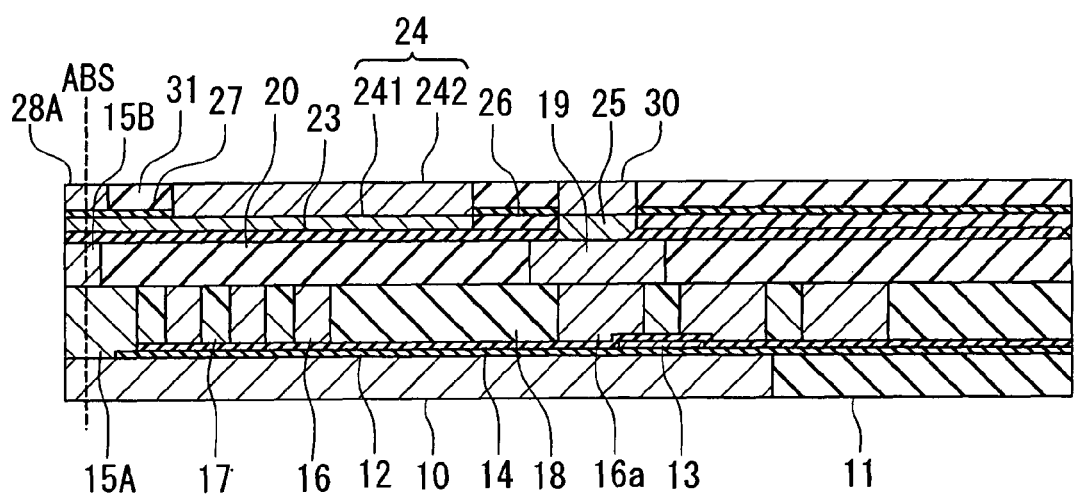
FIG. 16 is a cross-sectional view illustrating a step that follows the step of FIG. 15.

FIG. 16 illustrates the next step. In this step, first, the insulating layer 31 is formed on the entire top surface of the layered structure of FIG. 15. Next, the insulating layer 31, the first layer 28A, the second layer 242 and the connecting layer 30 are polished by CMP, for example, so that the first layer 28A, the second layer 242 and the connecting layer 30 are exposed and these layers achieve desired thicknesses, and the top surfaces of these layers are thereby flattened.

Figure 17:
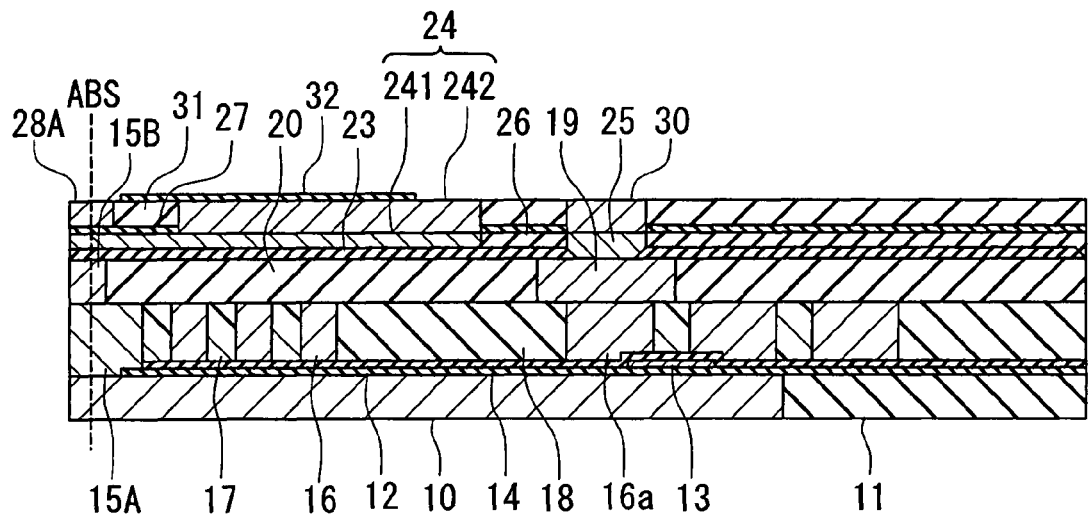
FIG. 17 is a cross-sectional view illustrating a step that follows the step of FIG. 16.

Next, as shown in FIG. 17, the insulating layer 32 is formed on a portion of the top surface of the second layer 242 and a portion of the top surface of the insulating layer 31. The insulating layer 32 may be formed by etching a portion of an insulating film formed on the entire top surface of the layered structure of FIG. 16 by ion milling, for example, or may be formed by lift-off.

Figure 18:
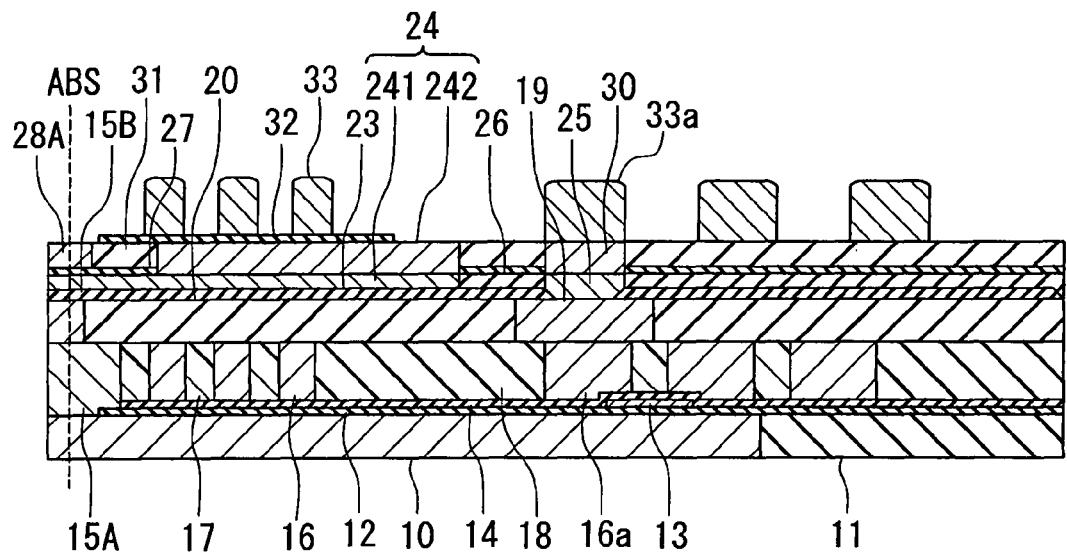
FIG. 18 is a cross-sectional view illustrating a step that follows the step of FIG. 17.
Figure 19:
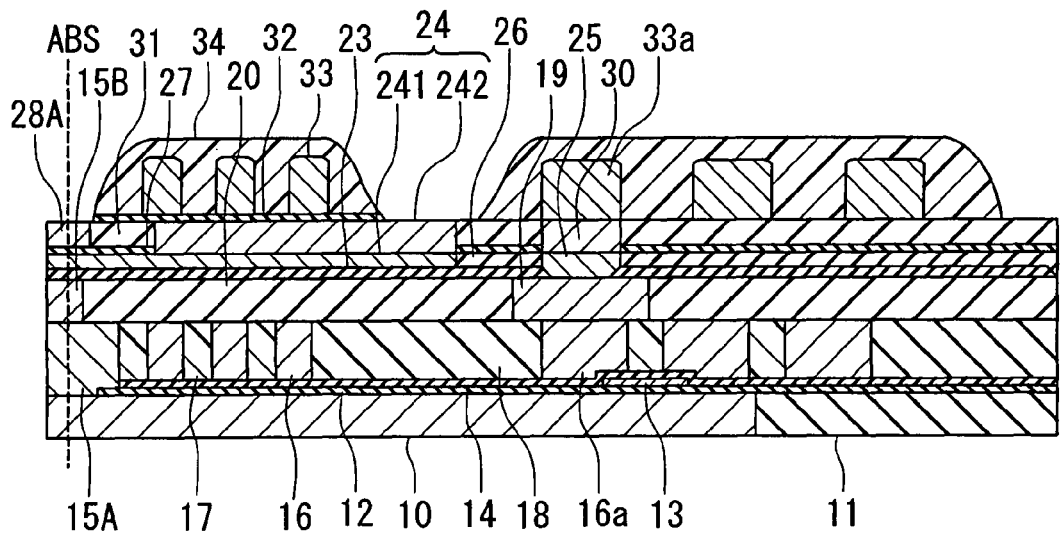
FIG. 19 is a cross-sectional view illustrating a step that follows the step of FIG. 18.
Figure 20:
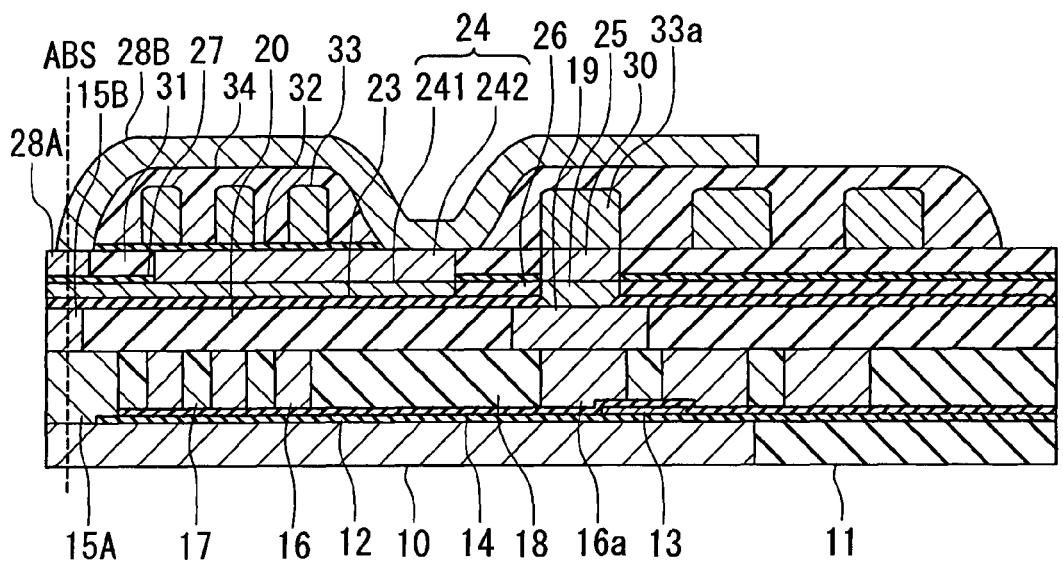
FIG. 20 is a cross-sectional view illustrating a step that follows the step of FIG. 19.
Figure 21:
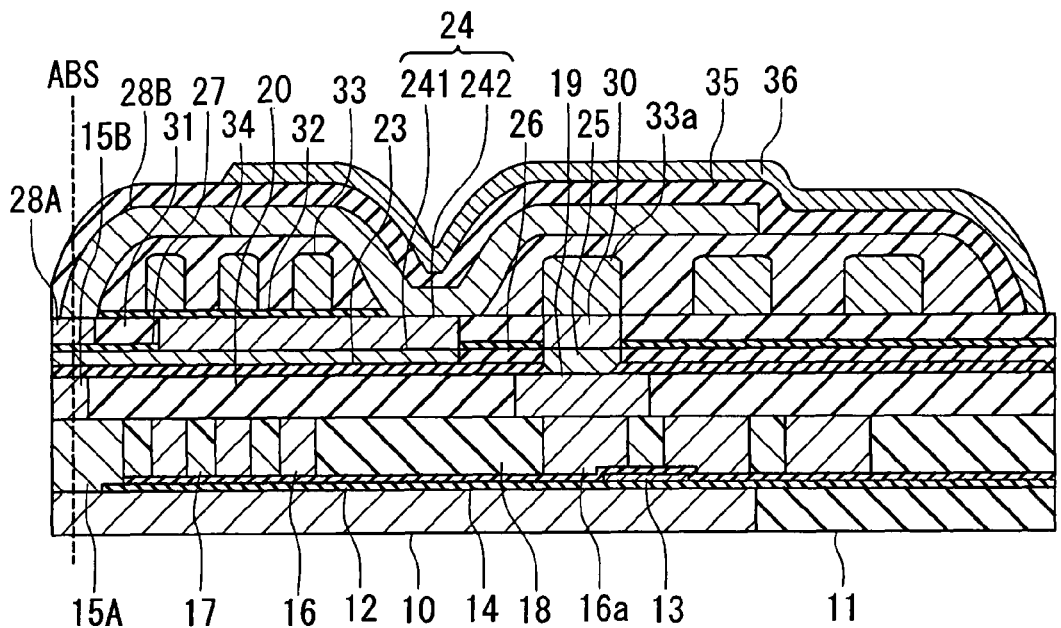
FIG. 21 is a cross-sectional view illustrating a step that follows the step of FIG. 20.

Next, as shown in FIG. 18, the coil 33 is formed. The connecting portion 33a of the coil 33 is disposed on the connecting layer 30, and the other portion of the coil 33 is disposed on the insulating layer 32. Next, as shown in FIG. 19, the insulating layer 34 is formed to cover the coil 33. Next, as shown in FIG. 20, the second layer 28B is formed by frame plating, for example. Next, as shown in FIG. 21, the protection film 35 is formed by sputtering, for example, so as to cover the second layer 28B and the insulating layer 34. Next, the functional film 36 is formed on the protection film 35. In the case of forming the functional film 36 such that an end of the functional film 36 closer to the medium facing surface 40 is located at a distance from the medium facing surface 40, the functional film 36 may be formed in the following manner. First, a film to become the functional film 36 is formed by sputtering, for example, so as to cover the entire top surface of the protection film 35. Next, the film to become the functional film 36 is patterned by dry etching such as reactive ion etching or ion milling. The film thus patterned is the functional film 36.

Next, although not shown, bumps for wiring are formed and then the overcoat layer 37 is formed as shown in FIG. 2. Next, wiring and terminals and so on are formed on the overcoat layer 37. In the embodiment, two terminals connected to the MR element 5, two terminals connected to the coils 16 and 33, and two terminals connected to the heater 13 are formed on the overcoat layer 37. The substructure is thus fabricated.

Next, as previously described, the substructure is cut, the surface to be the medium facing surface 40 is lapped to form the medium facing surface 40, flying rails are formed in the medium facing surface 40, and the slider including the magnetic head is thus completed.

Figure 22:
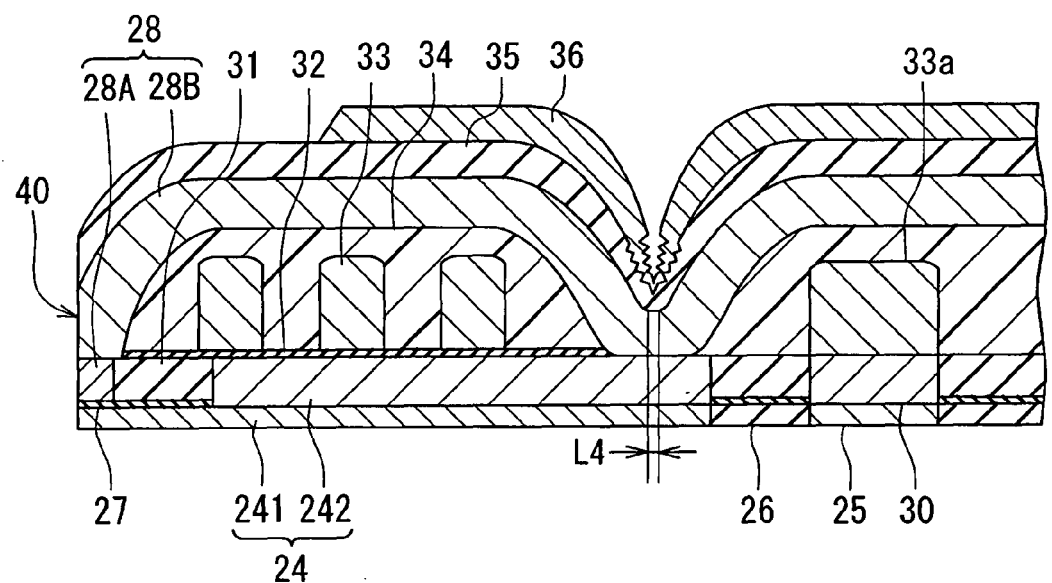
FIG. 22 is a cross-sectional view illustrating a main part of a magnetic head of a first comparative example against the magnetic head of the embodiment of the invention.

Reference is now made to FIG. 22 to describe the reason why the present embodiment requires that the length L4 of the second flat portion P2 be within the range of 0.3 to 6 µm. FIG.

22 is a cross-sectional view of a main part of a magnetic head of a first comparative example against the magnetic head of the present embodiment. In this comparative example, the length L4 is smaller than 0.3 µm. The greater the space inside the insulating layer 34, the greater the length L4. The smaller the above-mentioned space, the smaller the length L4. If the above-mentioned space and the length L4 are made smaller, as shown in FIG. 22, it becomes difficult to form without defects the recessed portion of the second magnetic layer 28B to be disposed in the space and a portion of another layer (such as the protection film 35 and the functional film 36) to be disposed on the recessed portion. This can lead to a reduction in reliability of the magnetic head. To avoid such a problem, it is preferred that the length L4 be 0.3 µm or greater.

As the length L4 is increased, it becomes necessary to increase the distance L3 between the two inner edges of the coil 33 located opposite to each other with the first flat portion P1 disposed in between. However, an increase in the distance L3 leads to an increase in length of the coil 33, which causes an increase in resistance of the coil 33. As a result, there will noticeably occur the phenomenon in which the end face of the pole layer 24 and the end face of the second shield 28 located in the medium facing surface 40 protrude toward the recording medium. To avoid such a problem, it is preferred that the length L4 be 6 µm or smaller.

Because of the foregoing, the present embodiment requires that the length L4 of the second flat portion P2 be within the range of 0.3 to 6 µm.

The length L2 of the first flat portion P1 is approximately expressed by Equation (1) below. Equation (1) is easily derived from the relationship among L2, L3, H and S shown in the portion (a) of FIG. 1.

$$L2=L3-2\times(H/\tan S) \quad (1)$$

Here, L3 and H are designed so as to avoid the above-mentioned problem resulting from an increase in resistance of the coil 33. S is approximately determined if L3 and H are determined. If L3, H and S are determined, L2 is approximately determined from Equation (1).

L4 is approximately expressed by Equation (2) below.

$$L4=L2-2\times(t\times\tan(S/2)) \quad (2)$$

Therefore, if L4, t and S are determined, L2 is approximately determined from Equation (2). Based on such relationships of Equations (1) and (2), the range of L2 is approximately determined depending on the range of each of L3, L4, H, t and S.

Figure 23:
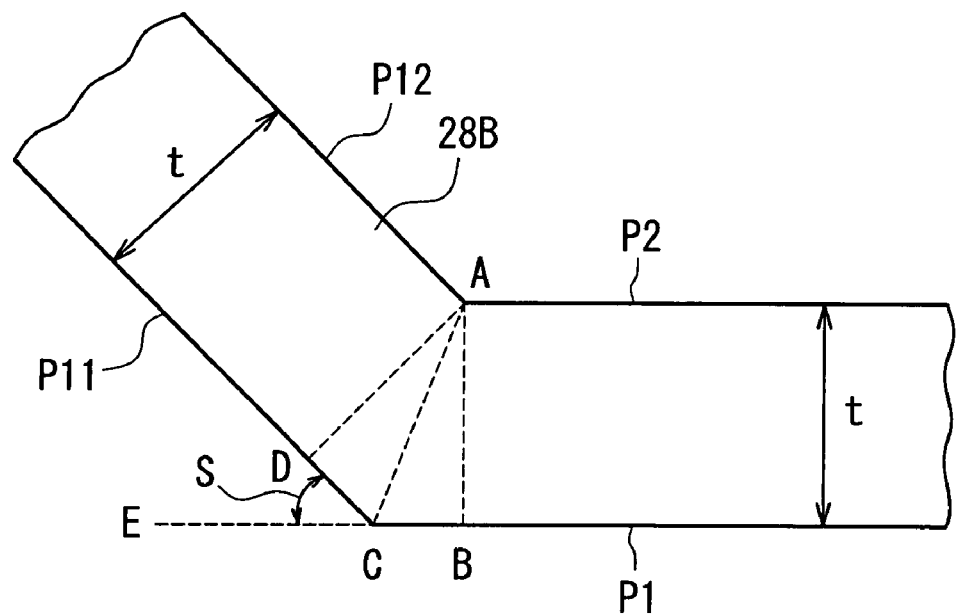
FIG. 23 is a cross-sectional view schematically illustrating part of a recessed portion of the second magnetic layer of the embodiment of the invention.

With reference to FIG. 23, it will now be clarified that Equation (2) is derived from the relationship among L2, L4, t and S shown in the portion (a) of FIG. 1. FIG. 23 is a cross-sectional view schematically illustrating part of the recessed portion of the second magnetic layer 28B. In FIG. 23, P11 indicates the inclined portion of the bottom surface of the recessed portion of the second magnetic layer 28B touching the surface of the insulating layer 34, as previously mentioned. The inclined portion P11 is contiguous to the first flat portion P1. P12 indicates an inclined portion of the top surface of the recessed portion of the second magnetic layer 28B contiguous to the second flat portion P2. 'A' indicates a point of intersection of the second flat portion P2 and the inclined portion P12 in the cross section of FIG. 23. 'C' indicates a point of intersection of the first flat portion P1 and the inclined portion P11 in the cross section of FIG. 23. Here, as shown in FIG. 23, additional lines AB, AC, AD and EC are drawn. 'B' indicates a point of intersection of the first flat portion P1 and a straight line passing through the point A and orthogonal to the first flat portion P1. 'D' indicates a point of intersection of the inclined portion P11 and a straight line passing through the point A and orthogonal to the inclined portion P11. 'E' indicates a point located along an extension of the line segment BC and located opposite to the point B with the point C located therebetween.

In FIG. 23, right triangles ADC and ABC are congruent since the sides AD and AB are equal in length, and the side AC of the triangle ADC and the side AC of the triangle ABC are equal in length. Consequently, the angle ACD and the angle ACB are equal. In addition, the sum of the angle S and twice the angle ACB is 180 degrees. Therefore, the angle ACB is (180−S)/2 degrees. The angle CAB is obtained from the equation below.

$$\angle CAB=90-\angle ACB=90-(180-S)/2=S/2 \text{(degrees)}$$

The length of the line segment BC is obtained from the equation below.

$$BC=AB\times\tan(\angle CAB)=t\times\tan(S/2)$$

L2 shown in the portion (a) of FIG. 1 is expressed by the equation below.

$$L2=L4+2\times BC=L4+2\times\{t\times\tan(S/2)\}$$

Equation (2) is thus obtained from the equation above.

Figure 24:
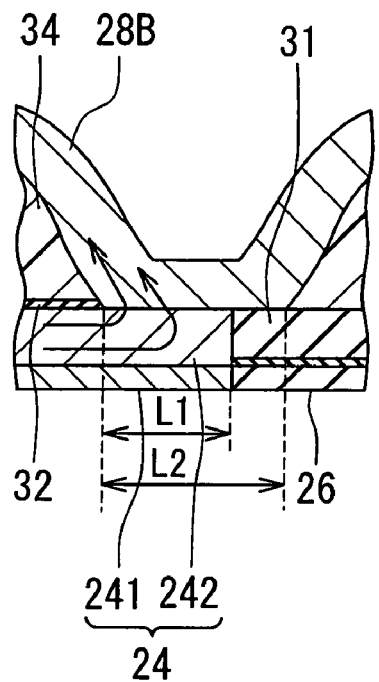
FIG. 24 is an explanatory view illustrating the flow of a magnetic flux in the magnetic head of the embodiment of the invention.
Figure 25:
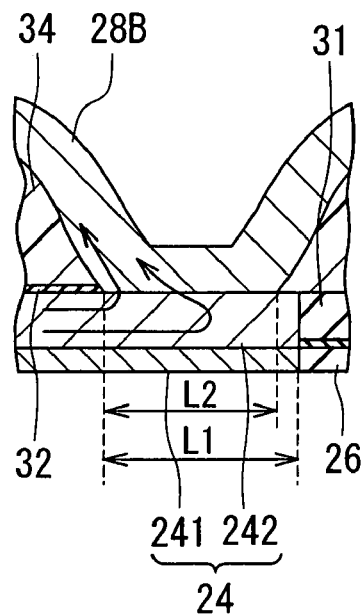
FIG. 25 is an explanatory view illustrating the flow of a magnetic flux in a magnetic head of a second comparative example against the magnetic head of the embodiment of the invention.

Reference is now made to FIG. 24 and FIG. 25 to describe the reason why the present embodiment requires that L1 be within the range of 0.35 to 0.95 times L2. FIG. 24 illustrates a region around the joint between the first magnetic layer 242 and the second magnetic layer 28B of the present embodiment. FIG. 25 illustrates a region around a joint between the first magnetic layer 242 and the second magnetic layer 28B of a magnetic head of a second comparative example against the present embodiment. In the second comparative example, L1 is greater than L2. In FIG. 24 and FIG. 25, arrows schematically indicate the flow of a magnetic flux passing through the first magnetic layer 242 and the second magnetic layer 28B.

As shown in FIG. 25, if L1 is greater than L2, a superfluous flow of magnetic flux is generated in the first magnetic layer 242, and as a result, there is a possibility that the write characteristics of the magnetic head may suffer degradation. In the present embodiment, in contrast, since L1 is smaller than L2 as shown in FIG. 24, it is assumed that a superfluous flow of magnetic flux is hard to occur in the first magnetic layer 242.

Figure 26:
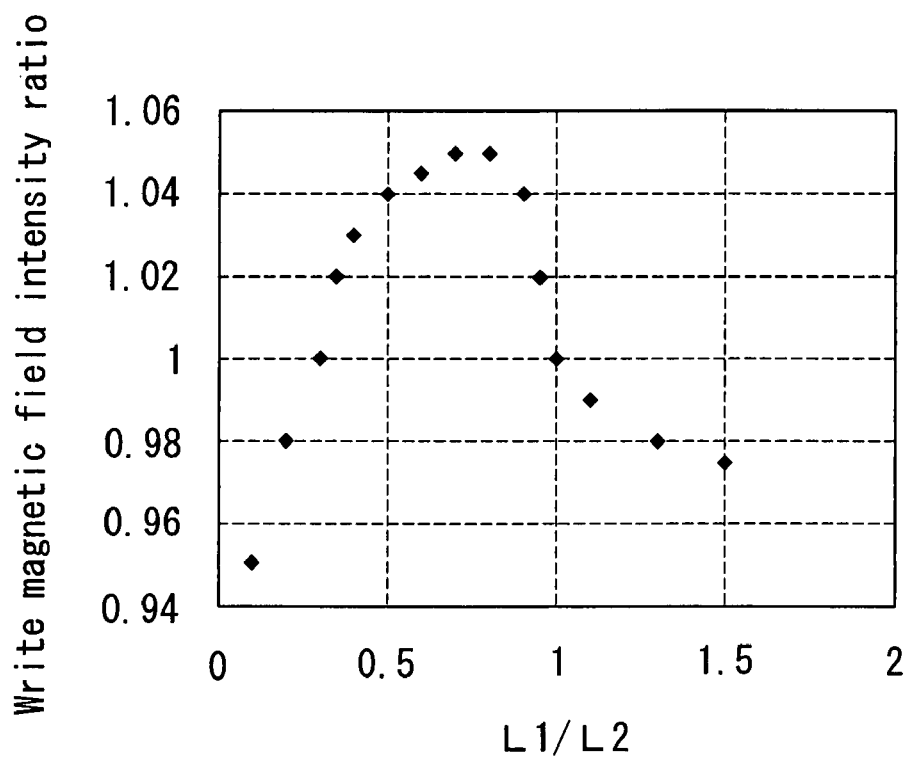
FIG. 26 is a plot illustrating simulation results for explaining the effects of the magnetic head of the embodiment of the invention.

A simulation was then performed to study an effect of the value of L1/L2 on the write magnetic field intensity. In the simulation the relationship between the value of L1/L2 and the write magnetic field intensity was studied with L2 fixed and L1 varied. Here, a value obtained by dividing a write magnetic field intensity where the value of L1/L2 is an arbitrary value by a write magnetic field intensity where the values of L1 and L2 are equal is defined as a write magnetic field intensity ratio. It can be said that the greater the write magnetic field intensity ratio, the better the write characteristics. FIG. 26 shows the relationship between L1/L2 and the write magnetic field intensity ratio obtained by the simulation. FIG. 26 indicates that, if the value of L1/L2 is greater than 1, the write magnetic field intensity ratio is smaller than 1. As can be seen from FIG. 26, it is possible to obtain a write magnetic field intensity ratio of 1.02 or greater by making L1 fall within a range of 0.35 to 0.95 times L2. Therefore, it is preferred that L1 be within the range of 0.35 to 0.95 times L2. For this reason, the present embodiment requires that L1 be within the range of 0.35 to 0.95 times L2. Furthermore, as can be seen from FIG. 26, it is possible to obtain a write magnetic field intensity ratio of 1.04 or greater by making L1 fall within a range of 0.5 to 0.9 times L2. Therefore, it is more preferred that L1 be within the range of 0.5 to 0.9 times L2.

In the embodiment, the distance L1 is within a range of 0.3 to 6 µm, for example. The length L2 is within a range of 1 to 7 µm, for example. The distance L3 is within a range of 1.5 to 10 µm, for example. The distance H is within a range of 0.5 to 3 µm, for example. The thickness 't' is within a range of 0.1 to 1 µm, for example. The angle S is within a range of 50 to 90 degrees, for example.

Figure 27:
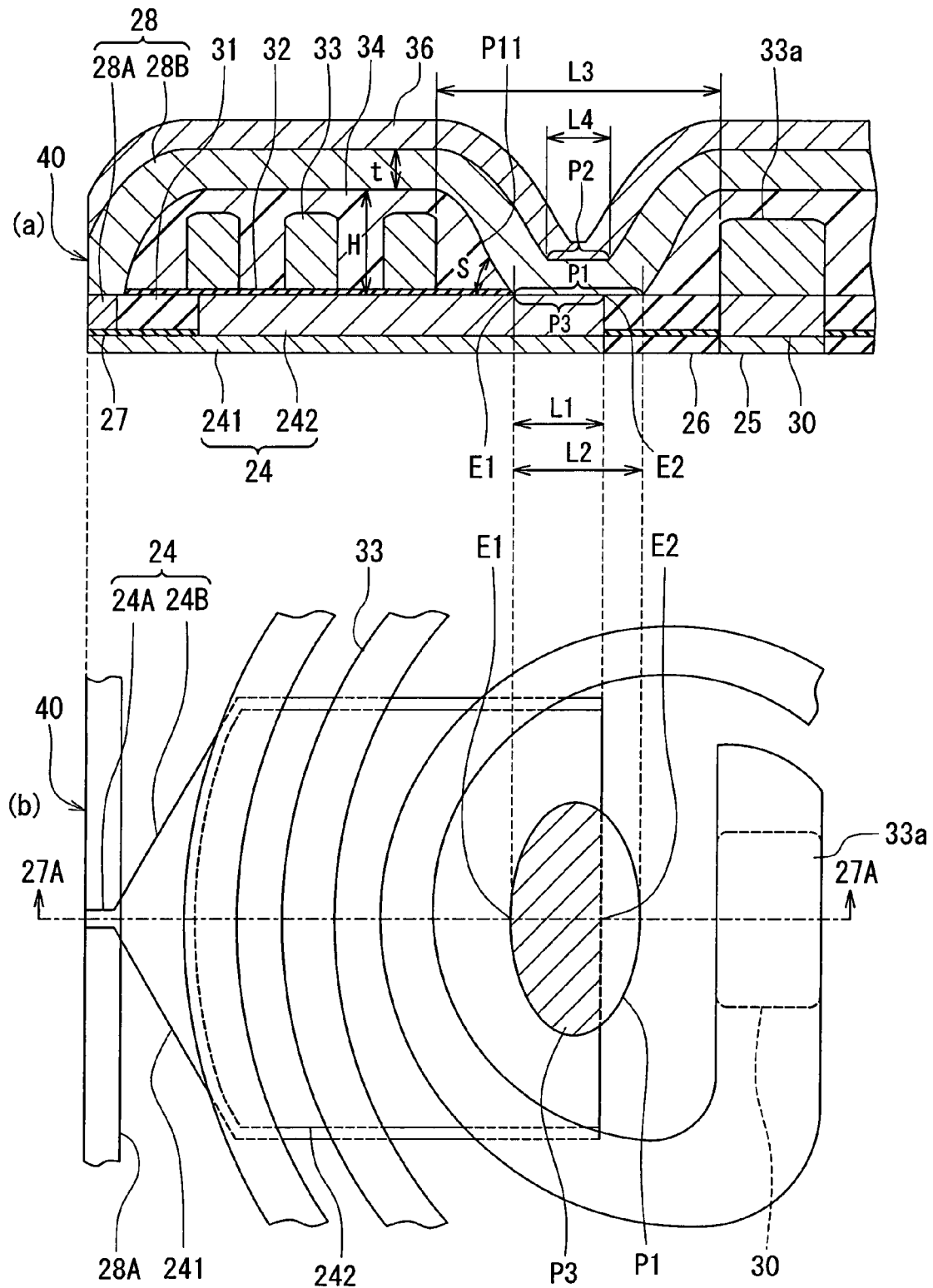
FIG. 27 is an explanatory view illustrating a main part of a magnetic head of a modification example of the embodiment of the invention.

Reference is now made to FIG. 27 to describe a magnetic head of a modification example of the embodiment. In FIG. 27, the portion (a) is a cross-sectional view of a main part of the magnetic head, while the portion (b) is a top view of the main part of the magnetic head. In FIG. 27 the portion (a) shows a cross section taken along line 27A-27A of the portion (b).

In this modification example, the protection film 35 is not provided and the functional film 36 is disposed on the top surface of the second layer 28B. The functional film 36 is formed to cover the second layer 28B and the insulating layer 34. In this modification example the functional film 36 has an end face located in the medium facing surface 40. The functional film 36 further has a recessed portion formed along the recessed portion of the second layer 28B. The remainder of the configuration of the modification example is the same as that of the magnetic head of FIG. 2.

Figure 28:
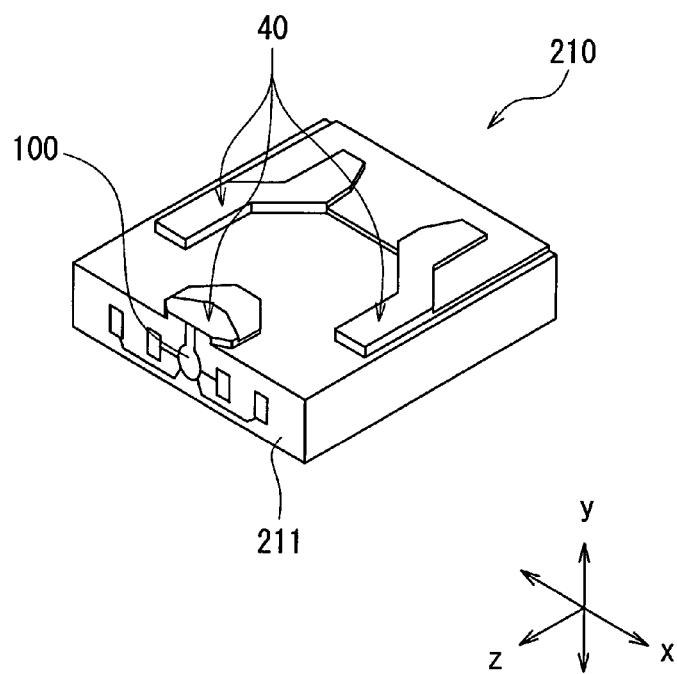
FIG. 28 is a perspective view illustrating an example of the appearance of a slider including the magnetic head of the embodiment of the invention.

A head assembly and a magnetic disk drive of the embodiment will now be described. Reference is now made to FIG. 28 to describe a slider 210 incorporated in the head assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 37 of FIG. 2. The base body 211 is nearly hexahedron-shaped. One of the six surfaces of the base body 211 faces toward the magnetic disk platter. The medium facing surface 20 is formed in this one of the surfaces. When the magnetic disk platter rotates in the z direction of FIG. 28, an airflow passes between the magnetic disk platter and the slider 210, and a lift is thereby generated below the slider 210 in the y direction of FIG. 28 and exerted on the slider 210. The slider 210 flies over the surface of the magnetic disk platter by means of the lift. The x direction of FIG. 28 is across the tracks of the magnetic disk platter. The thin-film magnetic head 100 of the embodiment is formed near the air-outflow-side end (the end located at the lower left of FIG. 28) of the slider 210.

Figure 29:
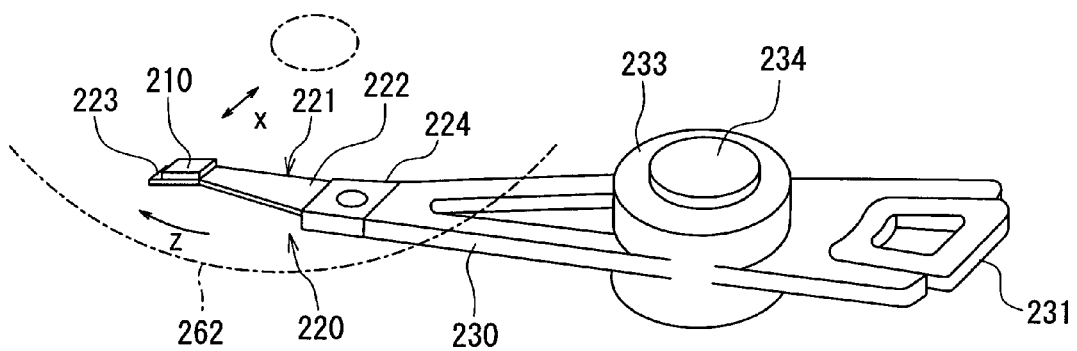
FIG. 29 is a perspective view of a head arm assembly of the embodiment of the invention.

Reference is now made to FIG. 29 to describe the head assembly of the embodiment. The head assembly of the embodiment has the slider 210 and a supporter that flexibly supports the slider 210. Modes of this head assembly include a head gimbal assembly and a head arm assembly described below.

The head gimbal assembly 220 will be first described. The head gimbal assembly 220 has the slider 210 and a suspension 221 as the supporter that flexibly supports the slider 210. The suspension 221 has: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms wherein the head gimbal assembly 220 is attached to each of the arms is called a head stack assembly.

FIG. 29 illustrates the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 30:
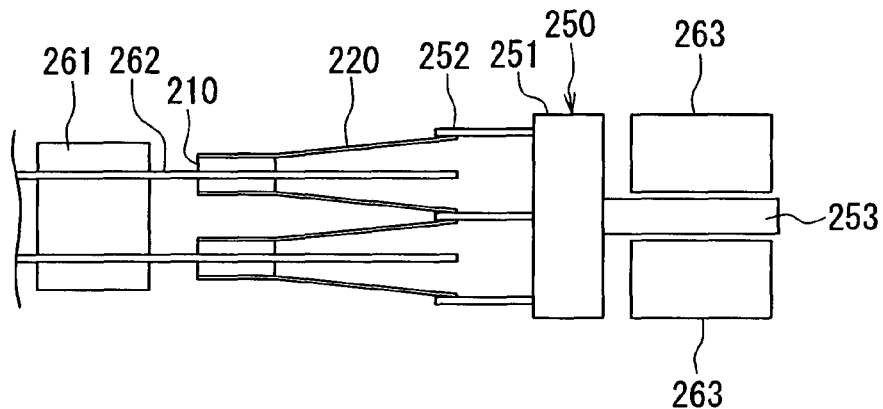
FIG. 30 is an explanatory view for illustrating a main part of a magnetic disk drive of the embodiment of the invention.
Figure 31:
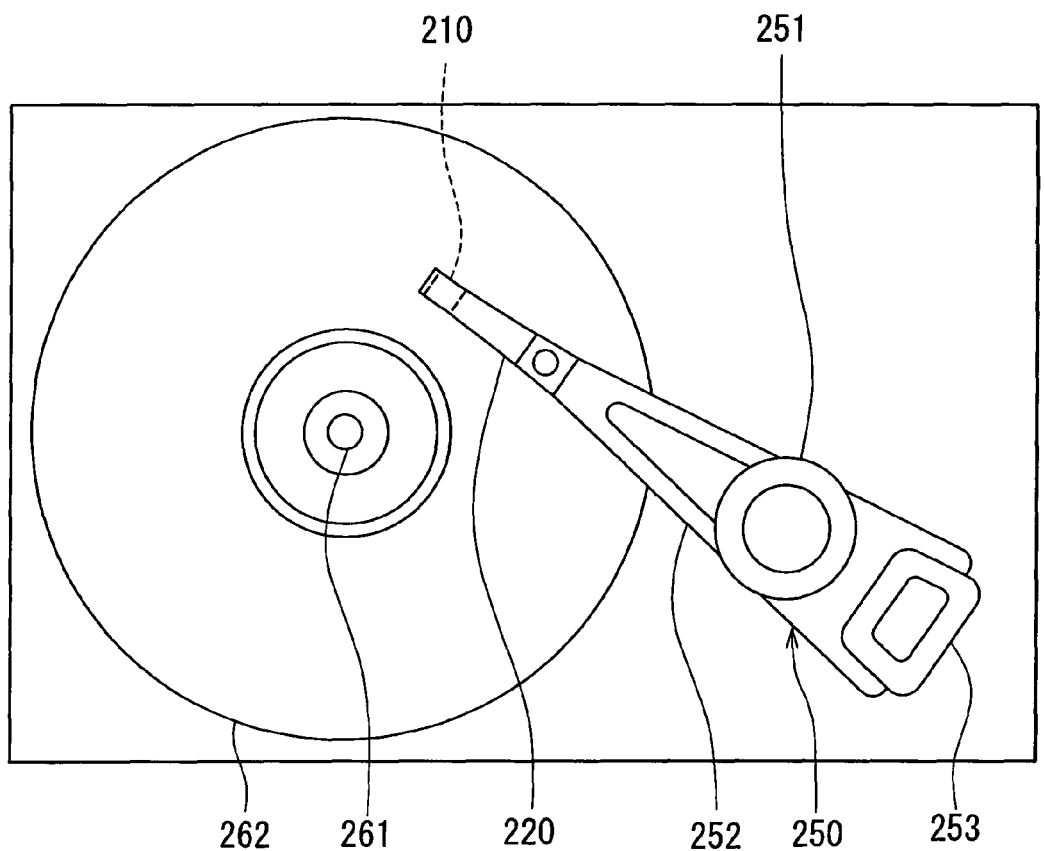
FIG. 31 is a top view of the magnetic disk drive of the embodiment of the invention.

Reference is now made to FIG. 30 and FIG. 31 to describe an example of the head stack assembly and the magnetic disk drive of the embodiment. FIG. 30 is an explanatory view illustrating a main part of the magnetic disk drive, and FIG. 32 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The head assembly and the magnetic disk drive of the embodiment exhibit effects similar to those of the foregoing magnetic head of the embodiment.

The present invention is not limited to the foregoing embodiment but various modifications can be made thereto. For example, while the embodiment has been described with reference to a magnetic head for the perpendicular magnetic recording system, the present invention is also applicable to a magnetic head for the longitudinal magnetic recording system having a bottom pole layer and a top pole layer. In this case, the bottom pole layer corresponds to the first magnetic layer of the invention while the top pole layer corresponds to the second magnetic layer of the invention.

Furthermore, while the embodiment has been described with reference to a magnetic head having such a structure that the read head is formed on the base body and the write head is stacked on the read head, the read and write heads may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A thin-film magnetic head comprising:
a medium facing surface that faces toward a recording medium;
a first magnetic layer that has a top surface and extends in a direction intersecting the medium facing surface;
a coil that is flat, spiral-shaped and insulated from the first magnetic layer, and that has a portion located above the top surface of the first magnetic layer;
an insulating layer that is toroidal in shape with a space formed inside, and that covers the coil and has a portion located above the top surface of the first magnetic layer; and
a second magnetic layer that has a bottom surface closer to the first magnetic layer and a top surface opposite to the bottom surface, extends in a direction intersecting the medium facing surface, touches the insulating layer, and is disposed such that the portion of the coil is sandwiched between the first and second magnetic layers, wherein:
the second magnetic layer has a recessed portion that enters the space inside the insulating layer;
in the recessed portion, the bottom surface of the second magnetic layer includes a first flat portion a part of which touches the top surface of the first magnetic layer, and the top surface of the second magnetic layer includes a second flat portion located in the space and substantially parallel to the first flat portion; and
in a cross section that is orthogonal to the medium facing surface and to an interface between the top surface of the first magnetic layer and the first flat portion and that divides each of the first and second magnetic layers into two equal portions, the second flat portion has a length within a range of 0.3 to 6 µm, and a distance from an edge of the interface between the top surface of the first magnetic layer and the first flat portion closer to the medium facing surface to an edge of the top surface of the first magnetic layer farther from the medium facing surface is within a range of 0.35 to 0.95 times a length of the first flat portion.

2. The thin-film magnetic head according to claim 1, wherein, in the cross section that divides each of the first and second magnetic layers into two equal portions, the distance from the edge of the interface between the top surface of the first magnetic layer and the first flat portion closer to the medium facing surface to the edge of the top surface of the first magnetic layer farther from the medium facing surface is within a range of 0.5 to 0.9 times the length of the first flat portion.

3. The thin-film magnetic head according to claim 1, further comprising a film disposed on the top surface of the second magnetic layer, the film having a recessed portion formed along the recessed portion of the second magnetic layer.

4. The thin-film magnetic head according to claim 1, wherein the first magnetic layer constitutes at least part of a pole layer that generates a write magnetic field for writing data on the recording medium by means of a perpendicular magnetic recording system, while the second magnetic layer constitutes at least part of a shield layer.

5. A head assembly comprising: a slider including a thin-film magnetic head and disposed to face toward a recording medium; and a supporter flexibly supporting the slider,
the thin-film magnetic head comprising:
a medium facing surface that faces toward the recording medium;
a first magnetic layer that has a top surface and extends in a direction intersecting the medium facing surface;
a coil that is flat, spiral-shaped and insulated from the first magnetic layer, and that has a portion located above the top surface of the first magnetic layer;
an insulating layer that is toroidal in shape with a space formed inside, and that covers the coil and has a portion located above the top surface of the first magnetic layer; and
a second magnetic layer that has a bottom surface closer to the first magnetic layer and a top surface opposite to the bottom surface, extends in a direction intersecting the medium facing surface, touches the insulating layer, and is disposed such that the portion of the coil is sandwiched between the first and second magnetic layers, wherein:
the second magnetic layer has a recessed portion that enters the space inside the insulating layer;
in the recessed portion, the bottom surface of the second magnetic layer includes a first flat portion a part of which touches the top surface of the first magnetic layer, and the top surface of the second magnetic layer includes a second flat portion located in the space and substantially parallel to the first flat portion; and
in a cross section that is orthogonal to the medium facing surface and to an interface between the top surface of the first magnetic layer and the first flat portion and that divides each of the first and second magnetic layers into two equal portions, the second flat portion has a length within a range of 0.3 to 6 µm, and a distance from an edge of the interface between the top surface of the first magnetic layer and the first flat portion closer to the medium facing surface to an edge of the top surface of the first magnetic layer farther from the medium facing surface is within a range of 0.35 to 0.95 times a length of the first flat portion.

6. A magnetic disk drive comprising: a slider including a thin-film magnetic head and disposed to face toward a recording medium that is driven to rotate; and an alignment device supporting the slider and aligning the slider with respect to the recording medium,
the thin-film magnetic head comprising:
a medium facing surface that faces toward the recording medium;
a first magnetic layer that has a top surface and extends in a direction intersecting the medium facing surface;
a coil that is flat, spiral-shaped and insulated from the first magnetic layer, and that has a portion located above the top surface of the first magnetic layer;
an insulating layer that is toroidal in shape with a space formed inside, and that covers the coil and has a portion located above the top surface of the first magnetic layer; and
a second magnetic layer that has a bottom surface closer to the first magnetic layer and a top surface opposite to the bottom surface, extends in a direction intersecting the medium facing surface, touches the insulating layer, and is disposed such that the portion of the coil is sandwiched between the first and second magnetic layers, wherein:
the second magnetic layer has a recessed portion that enters the space inside the insulating layer;
in the recessed portion, the bottom surface of the second magnetic layer includes a first flat portion a part of which touches the top surface of the first magnetic layer, and the top surface of the second magnetic layer includes a second flat portion located in the space and substantially parallel to the first flat portion; and in a cross section that is orthogonal to the medium facing surface and to an interface between the top surface of the first magnetic layer and the first flat portion and that divides each of the first and second magnetic layers into two equal portions, the second flat portion has a length within a range of 0.3 to 6 µm, and a distance from an edge of the interface between the top surface of the first magnetic layer and the first flat portion closer to the medium facing surface to an edge of the top surface of the first magnetic layer farther from the medium facing surface is within a range of 0.35 to 0.95 times a length of the first flat portion.

7. A method of manufacturing a thin-film magnetic head, the thin-film magnetic head comprising:

a medium facing surface that faces toward a recording medium;

a first magnetic layer that has a top surface and extends in a direction intersecting the medium facing surface;

a coil that is flat, spiral-shaped and insulated from the first magnetic layer, and that has a portion located above the top surface of the first magnetic layer;

an insulating layer that is toroidal in shape with a space formed inside, and that covers the coil and has a portion located above the top surface of the first magnetic layer; and a second magnetic layer that has a bottom surface closer to the first magnetic layer and a top surface opposite to the bottom surface, extends in a direction intersecting the medium facing surface, touches the insulating layer, and is disposed such that the portion of the coil is sandwiched between the first and second magnetic layers, wherein:

the second magnetic layer has a recessed portion that enters the space inside the insulating layer;

in the recessed portion, the bottom surface of the second magnetic layer includes a first flat portion a part of which touches the top surface of the first magnetic layer, and the top surface of the second magnetic layer includes a second flat portion located in the space and substantially parallel to the first flat portion; and in a cross section that is orthogonal to the medium facing surface and to an interface between the top surface of the first magnetic layer and the first flat portion and that divides each of the first and second magnetic layers into two equal portions, the second flat portion has a length within a range of 0.3 to 6 µm, and a distance from an edge of the interface between the top surface of the first magnetic layer and the first flat portion closer to the medium facing surface to an edge of the top surface of the first magnetic layer farther from the medium facing surface is within a range of 0.35 to 0.95 times a length of the first flat portion, the method comprising the steps of:

forming the first magnetic layer;

forming the coil after the first magnetic layer is formed;

forming the insulating layer after the coil is formed; and forming the second magnetic layer after the insulating layer is formed.

* * * * *